United States Patent [19]

Saigo et al.

[11] Patent Number: 4,991,305
[45] Date of Patent: Feb. 12, 1991

[54] SPECTACLE-LENS-FRAME CONFIGURATION MEASURING APPARATUS AND ARTICLE CONFIGURATION MEASURING APPARATUS

[75] Inventors: Tsuyoshi Saigo; Takeo Koseki, both of Nishitama; Noboru Okushi, Fussa; Shuichi Sato, Oume, all of Japan

[73] Assignee: Hoya Corporation, Tokyo, Japan

[21] Appl. No.: 355,757

[22] Filed: May 23, 1989

[30] Foreign Application Priority Data

May 30, 1988 [JP] Japan .............................. 63-71484[U]
Jun. 2, 1988 [JP] Japan .............................. 63-136460
Jun. 2, 1988 [JP] Japan .............................. 63-136461

[51] Int. Cl.$^5$ ........................ G01C 25/00; G01B 7/28
[52] U.S. Cl. ........................................ 33/507; 33/28; 33/200; 33/1 M
[58] Field of Search ................. 33/200, 507, 1 M, 28

[56] References Cited

U.S. PATENT DOCUMENTS 4,724,617 2/1988 Logan et al. .......................... 33/28

FOREIGN PATENT DOCUMENTS 0190450 8/1986 European Pat. Off. .............. 33/507

Primary Examiner—Harry N. Haroian
Attorney, Agent, or Firm—Nixon & Vanderhye

[57] ABSTRACT

In an apparatus for measuring a configuration of each of a pair of lens frames (4a, 4b) of a spectacle framework (3), a measuring element (230) is arranged for horizontal and vertical movement relative to the lens frames fixedly held by a holding device (100). The measuring element is movable angularly about an optional reference point (O) within one of the lens frames, along an inner periphery of the lens frame, while causing the measuring element to be in contact with the inner periphery of the lens frame. A first detector unit (224) detects horizontal straight displacement (r) of the measuring element from the reference point. A second detector unit (233) detects vertical straight displacement (z) of the measuring element from the reference point. A third detector unit (209) detects an angle ($\theta$) of the angular movement of the measuring element about the reference point. The configuration of the inner periphery of the lens frame is calculated on the basis of signals from the respective first, second and third detector units. Also disclosed are an apparatus for measuring a configuration of a substantially planar article (500), and a holding device for a pair of lens frames of a spectacle framework.

18 Claims, 19 Drawing Sheets

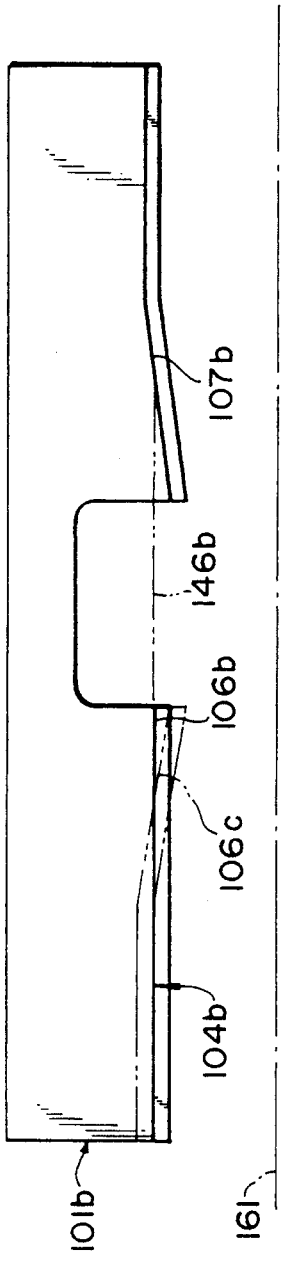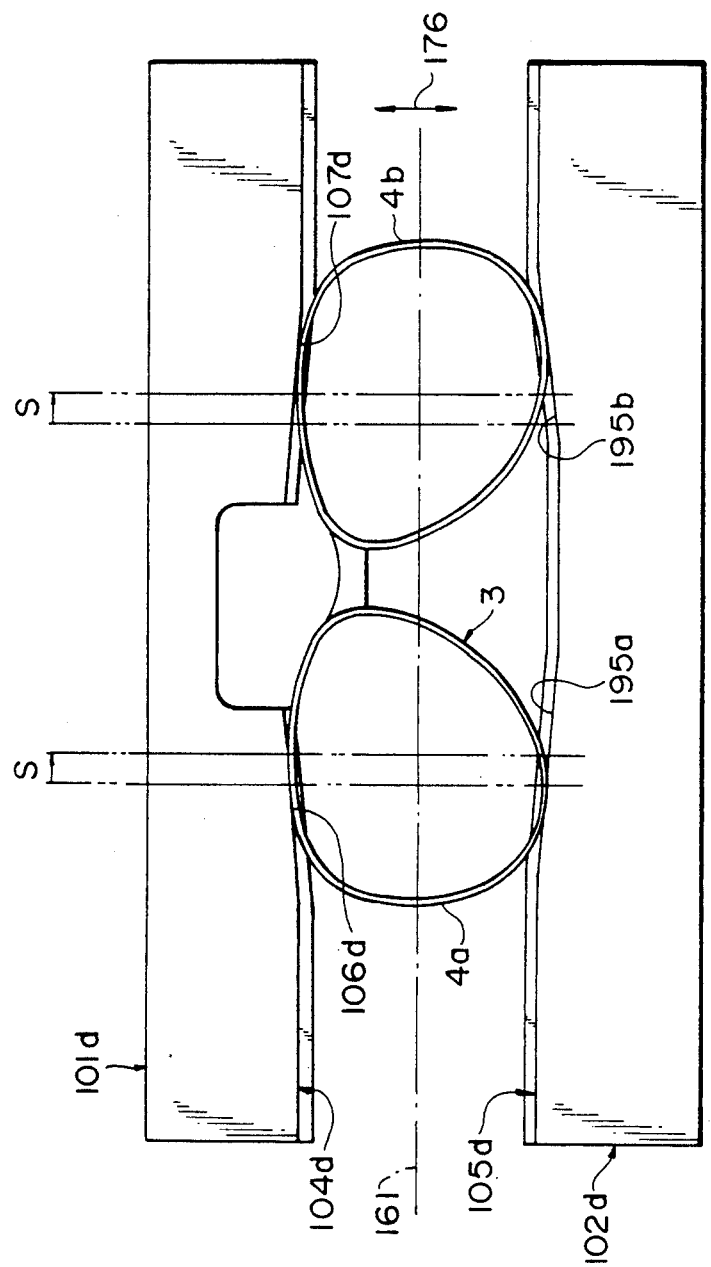

SPECTACLE-LENS-FRAME CONFIGURATION MEASURING APPARATUS AND ARTICLE CONFIGURATION MEASURING APPARATUS

BACKGROUND OF THE INVENTION

The present invention relates to an apparatus for measuring a configuration of each of a pair of lens frames of a spectacle framework in a three-dimensional manner, and to an apparatus for measuring a configuration of an article such as, for example, a demonstration lens, a spectacle lens, a template, an optical lens or the like.

An apparatus for measuring a configuration of each of a pair of lens frames of a spectacle framework is known, which comprises a holding device for fixedly holding the lens frames. As shown in FIG. 25 of the accompanying drawings, the conventional holding device comprises a pair of first and second holding members 1 and 2. The first and second holding members 1 and 2 are so arranged that at least one of the first and second holding members is capable of being translated toward and away from the other holding member in a direction indicated by an arrow 9. The at least one holding member can fixedly be retained at the translated position. The arrangement is such that, when the at least one holding member is translated toward the other holding member, opposed abutment faces of the respective holding members cooperate with each other to clamp the pair of lens frames 4a and 4a of the spectacle framework 3 horizontally. Thus, the pair of lens frames 4a and 4b are held by the holding device fixedly, but lightly or gently.

However, the conventional holding device has the following problems. That is, generally, there may be a case where, due to manufacturing errors or deformation after manufacturing, the left- and right-hand lens frames 4a and 4b of the spectacle framework 3 differ in configuration from each other, or the width $B_L$ of the left-hand lens frame 4a differs from that $B_R$ of the right-hand lens frame 4b such, for example, that $B_R$ is smaller than $B_L$. For this reason, as shown in FIG. 25, when the pair of lens frames 4a and 4b are clamped between the first and second holding members 1 and 2, a slight gap s is left between the first holding member 1 and the left-hand lens frame 4b, so that the spectacle framework 3 cannot be held in a stable manner. Under the circumstances, if a measuring element such as a contact roller or a measuring probe disclosed in, for example, Japanese Patent Provisional Publication No. SHO 62-169009 is in contact with the inner periphery of the lens frame 4b such that the measuring element and the lens frame 4b are moved relatively to each other in order to measure the configuration of the lens frame 4b, the latter is unsteady, making it impossible to accurately measure the configuration of the inner periphery of the lens frame 4b. Further, the unsteadiness often causes the measuring element to be disengaged from the lens frame 4b so that the measurement per se is made impossible.

By the way, each lens frame of the spectacle framework has a contour which is, for example, substantially circular, rectangular, elliptic or the like in order to enable a spectacle lens to be fitted in the lens frame. Further, when the pair of lens frames are viewed vertically in a state in which the spectacles are put on his face, the pair of lens frames are arranged in a curved plane in conformity with the configuration of his face. Accordingly, in order to obtain accurate configuration information of the spectacle lens frames, it is required to know the curved configuration of the lens frames at the time the lens frames are viewed vertically, and what positions both the lens frames are arranged respectively in the curved plane, in addition to the two-dimensional configuration of each lens frame at the time the spectacle framework is viewed at front ways. In order to realize these requirements, a three-dimensional measuring apparatus has already been developed as disclosed in, for example, Japanese Patent Provisional Publication No. SHO 62-169008 and the aforesaid Japanese Patent Provisional Publication No. SHO 62-169009.

However, the above three-dimensional measuring apparatus has the following problems. That is, each of the radial displacement and the vertical displacement of the measuring element with respect to the lens frame is detected as an angle of the angular movement of the measuring element about a signal point on the outside of the lens frame. For this reason, variation in the angle with respect to the actual radial or vertical displacement is extremely small, making it difficult to accurately measure the configuration of the lens frame. Further, the variation in the angle is detected by the use of a rotary encoder. However, the detection of the variation in the angle can utilize only a part of the measuring range, that is, one revolution of the rotary encoder. Accordingly, if it is desired to raise the resolution power of the measurement, the rotary encoder is increased in size.

Apart from the above, when lenses are processed in conformity with the pair of lens frames of the spectacle framework, methods of obtaining information on numerical control processing of the lenses include a method of measuring a configuration of an outer periphery of a flat template identical in configuration with the lens frame, and a method of measuring a configuration of a lens fitting groove in an inner periphery of the lens frame, as disclosed in the aforementioned Japanese Patent Provisional Publication Nos. SHO 62-169008 and SHO 62-169009.

However, the above measuring methods have the following problem. Specifically, if the desirable lens frames are made of elongated wire material formed of metal, synthetic resinous material or the like so that there is no lens fitting groove in the inner periphery of the lens frame, or if there is no flat template, it is no longer possible for the above conventional measuring methods to obtain the information on the numerical control processing.

SUMMARY OF THE INVENTION

It is an object of the invention to provide an apparatus for measuring a configuration of each of a pair of lens frames of a spectacle framework, which is capable of measuring the configuration of an inner periphery of the lens frame highly accurately in a three-dimensional manner.

According to the invention, there is provided an apparatus for measuring a configuration of each of a pair of lens frames of a spectacle framework, the apparatus comprising:

holding means for fixedly holding the pair of lens frames;

a measuring element arranged adjacent the holding means for horizontal and vertical movement relative to the pair of lens frames fixedly held by the holding means;

moving means associated with the measuring element for moving the same angularly about an optional reference point within one of the pair of lens frames, along an inner periphery of the lens frame, while causing the measuring element to be in contact with the inner periphery of the lens frame;

first detecting means for detecting horizontal straight displacement of the measuring element from the reference point, during the movement of the measuring element along the inner periphery of the lens frame, to generate a signal representative of the horizontal straight displacement;

second detecting means for detecting vertical straight displacement of the measuring element from the reference point, during the movement of the measuring element along the inner periphery of the lens frame, to generate a signal representative of the vertical straight displacement;

third detecting means for detecting an angle of the angular movement of the measuring element about the reference point during the movement of the measuring element along the inner periphery of the lens frame, to generate a signal representative of the angle; and means connected to the first, second and third detecting means for calculating the configuration of the inner periphery of the lens frame on the basis of the signals from the respective first, second and third detecting means.

As described above, the arrangement of the measuring apparatus according to the invention is such that the horizontal and vertical displacements of the measuring element are detected as straight displacements without being converted into angles. With such arrangement, it is possible to measure the configuration of the inner periphery of the lens frame highly accurately.

It is another object of invention to provide a holding device capable of ensuring to hold a pair of lens frames of a spectacle framework even if the pair of lens frames differ in configuration from each other.

According to the invention, there is provided a holding device for holding a pair of lens frames of a spectacle framework, the holding device comprises:

a pair of first and second holding members arranged in spaced relation to each other with a first plane positioned between them, wherein the first plane includes geometric centers of the respective lens frames and extends perpendicularly to a second plane including the lens frames, the first and second holding members having their respective abutment faces opposed to each other; and moving means for translating at least one of the first and second holding members toward and away from the other, wherein, when the moving means translates the at least one holding member toward the other holding member, the abutment faces of the respective first and second holding members cooperate with each other to clamp therebetween the pair of lens frames, thereby holding the same;

wherein, of the first and second holding members, at least first holding member has its abutment face composed of a pair of face sections, at least one of the pair of face sections being inclined with respect to the first plane.

As described above, the arrangement of the holding device according to the invention is such that, of the first and second holding members, at least first holding member has its abutment face composed of the pair of face sections whose at least one is inclined with respect to the first plane. With such arrangement, if the pair of lens frames differ in configuration from each other, the spectacle framework moves along the first plane to bring both the lens frames into abutment against the abutment faces of the respective first and second holding members, which include at least one inclined face section, thereby making it possible to hold the pair of lens frames in a stable manner. Further, in case where the holding device according to the invention is incorporated in a measuring apparatus such as one described previously, it is possible to effectively prevent occurrence of measuring errors due to unstable holding of the pair of lens frames, and disengagement of a measuring element from the lens frames.

It is still another object of the invention to provide an apparatus for measuring a configuration of a substantially planar article, which is capable of measuring a configuration of an outer periphery of the article highly accurately.

According to the invention, there is provided an apparatus for measuring a configuration of a substantially planar article, the apparatus comprising:

holding means for clamping a substantially central region of the article from above and below to fixedly hold the article substantially horizontally;

a measuring element arranged adjacent the holding means for horizontal movement relative to the article fixedly held by the holding means;

moving means associated with the measuring element for moving the same angularly about an optional reference point along an outer periphery of the article, while causing the measuring element to be in contact with the outer periphery of the article;

first detecting means for detecting horizontal displacement of the measuring element from the reference point, during the movement of the measuring element along the outer periphery of the article, to generate a signal representative of the horizontal displacement;

second detecting means for detecting an angle of the angular movement of the measuring element about the reference point during the movement of the measuring element along the outer periphery of the article, to generate a signal representative of the angle; and means connected to the first and second detecting means for calculating the configuration of the outer periphery of the article on the basis of the signals from the respective first and second detecting means.

As described above, the arrangement of the measuring apparatus according to the invention is such that the substantially central region of the article is clamped by the holding means from above and below such that the article is held substantially horizontally, and that the horizontal displacement and the angle of the angular movement of the measuring element from the reference point are measured. With such arrangement, it is possible to measure the configuration of the outer periphery of any desirable article highly accurately.

BRIEF DESCRIPTION OF THE DRAWINGS

FIG. 8 is a plan view of another modification of the first holding member;

FIG. 9 is a plan view of a modification of the pair of first and second holding members;

DETAILED DESCRIPTION

The invention will be described, by way of mere examples, with reference to the drawings.

FIRST EMBODIMENT

Figure 1:
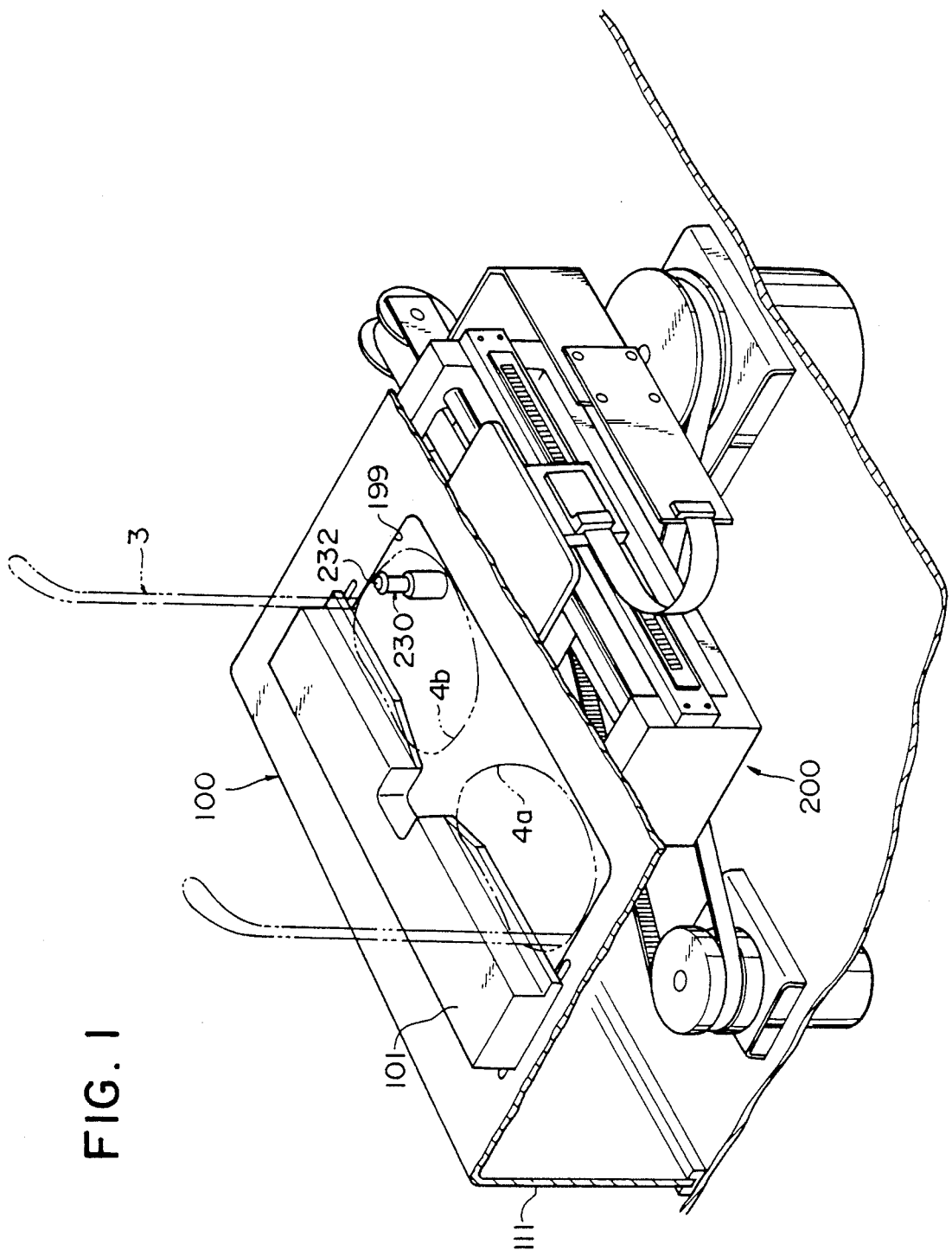
FIG. 1 is a partially broken-away perspective view showing the entire measuring apparatus according to a first embodiment of the invention, which comprises a holding device and a measuring device.

Referring to FIG. 1, there is illustrated an apparatus for measuring a configuration of each of a pair of lens frames 4a and 4a of a spectacle framework 3, according to a first embodiment of the invention. The measuring apparatus generally comprises a holding device 100 for holding the pair of lens frames 4a and 4b and a measuring device 200 arranged below the holding device 100 for measuring the configuration of an inner periphery of each of the lens frames 4a and 4b.

HOLDING DEVICE

The holding device 100 will first be described with reference to FIGS. 2 through 6.

Figure 2:
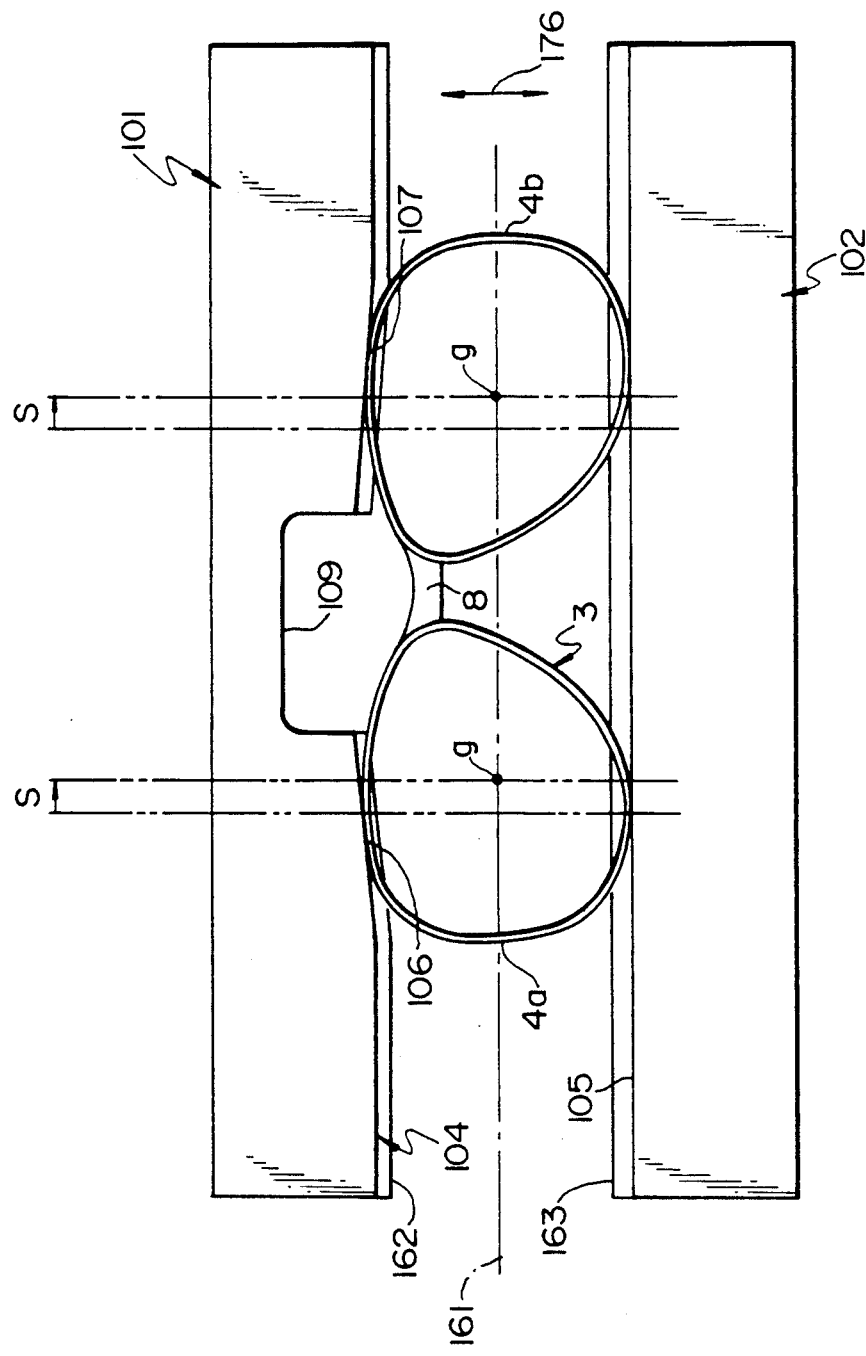
FIG. 2 is a view for explanation of the holding principle of the holding device illustrated in FIG. 1, showing a pair of first and second holding members.

The holding principle of the holding device 100 is illustrated in FIG. 2. The holding device 100 comprises a pair of elongated first and second holding members 101 and 102 which are arranged horizontally and in spaced relation to each other with a first plane 161 positioned between them. The first plane 161 includes geometric centers g and g of the respective lens frames 4a and 4b and extends perpendicularly to a second plane including the lens frames 4a and 4b. The first and second holding members 101 and 102 have their respective abutment faces 104 and 105 which are opposed to each other. The abutment faces 104 and 105 are formed respectively with step portions 162 and 163 on which the pair of lens frames 4a and 4b can rest. The first and second holding members 101 and 102 is capable of being translated toward and away from the other, to be described later. In this connection, it will be appreciated by one skilled in the art that one of the first and second holding members 101 and 102 may be fixed and immovable. It will suffice if at least one of the first and second members 101 and 102 is capable of translated toward and away from the other.

The abutment face 104 of the first holding member 101 is composed of a pair of inclined face sections 106 and 107. A relief recess 109 is formed in the holding member 101 at a location between the pair of inclined face sections 106 and 107, for enabling also spectacles having a top bridge to be clamped between the first and second holding members 101 and 102. The top bridge is mounted to the lens frames 4a and 4b at a location above a bridge 8 so as to project away from the bridge 8.

The pair of inclined face sections 106 and 107 of the abutment face of the first holding member 101 are inclined with respect to the first plane 161 so as to diverge toward the first plane 161. An angle defined between the pair of inclined face sections 106 and 107 is set to at least 0 degrees, but at most 180 degrees. In other words, if it is supposed that the inclined face section 106 is parallel to the first plane 161, an angle defined between the pair of face sections 106 and 107 is set to at least 90 degrees, but at most 180 degrees, preferably, to a range of from 170 to 175 degrees.

When it is desired to hold the lens frames 4a and 4b, at least one of the first and second holding members 101 and 102 is first translated toward the other. The pair of lens frames 4a and 4b are then mounted on the stepped portions 162 and 163. If the left- and right-hand lens frames 4a and 4b are fully identical in configuration with each other, only the translation of the at least one holding member enables the pair of lens frames 4a and 4b to be brought into contact with the abutment face 163 and the pair of inclined face sections 106 and 107, so that the lens frames 4a and 4b can be fixedly held by the first and second holding members 101 and 102. On the other hand, if the left- and right-hand lens frames 4a and 4b are different in configuration or size from each other, for example, if the right-hand lens frame 4b is smaller in size than the left-hand lens frame 4a, a gap will be formed between the inclined face section 107 and the lens frame 4b or between the abutment face 105 and the lens frame 4b. Thus, it is impossible to ensure holding of the lens frame 4b. In this case, accordingly, the pair of lens frames 4a and 4b are horizontally moved to the right by a distance S. By doing so, both the left- and right-hand lens frames 4a and 4b can be abutted respectively against the inclined face sections 106 and 107, making it possible to ensure holding both the lens frames 4a and 4b. It is needless to say that, if a gap is formed between the inclined face section 106 and the lens frame 4a or between the abutment face 105 and the lens frame 4a, the pair of lens frames 4a and 4b are horizontally moved to the left. That is, movement in the direction of the lens frame in which the gap is formed causes the lens frame having the larger gap to be moved in a direction in which an angle of the inclined face section is opened, so that the width of the abutment face of the lens frame has a freedom. Accordingly, the larger frame can utilize the abutment face and is fixed thereto, on the basis of the smaller frame.

Figure 3:
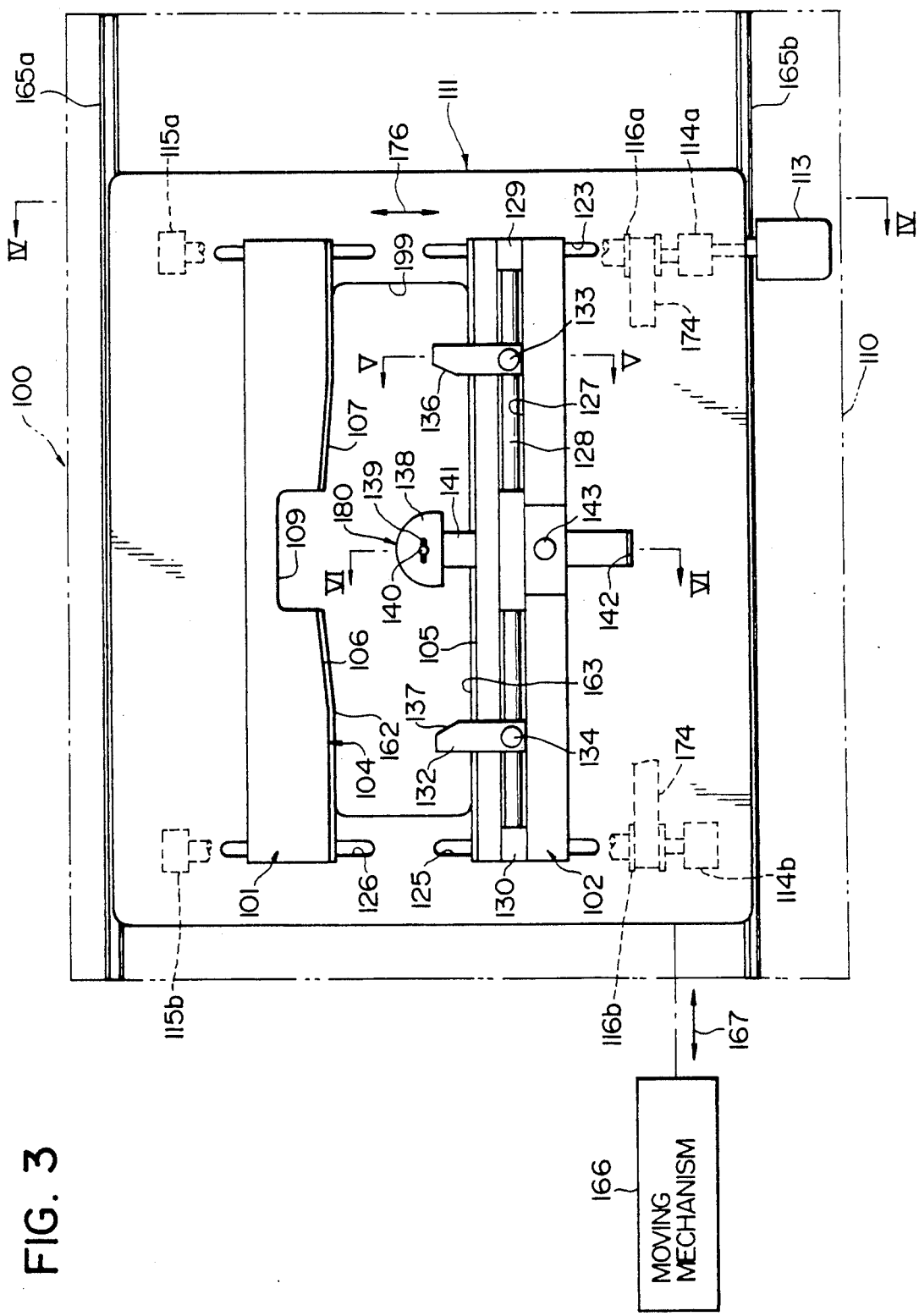
FIG. 3 is a top plan view of the holding device illustrated in FIG. 1.

Referring to FIG. 3, there is illustrated the details of the holding device 100 comprising the pair of first and second holding members 101 and 102 both of which are capable of being translated toward and away from each other in this illustrated embodiment. A pair of rails 165a and 165b are fixedly mounted to a stationary base 110 indicated by the double dotted lines. A frame table 111 is mounted on the pair of rails 165a and 165b for reciprocative sliding movement therealong by a moving mechanism 166 in a direction as indicated by an arrow 167, thereby enabling the left- and right-hand lens frames 4a and 4b to be measured in configuration. The frame table 111 is formed therein with a central opening 199 through which a measuring element or a stylus of the measuring device 200 extends as shown in FIG. 1 and to be described later. The first and second holding members 101 and 102 are arranged above the frame table 111.

Figure 4:
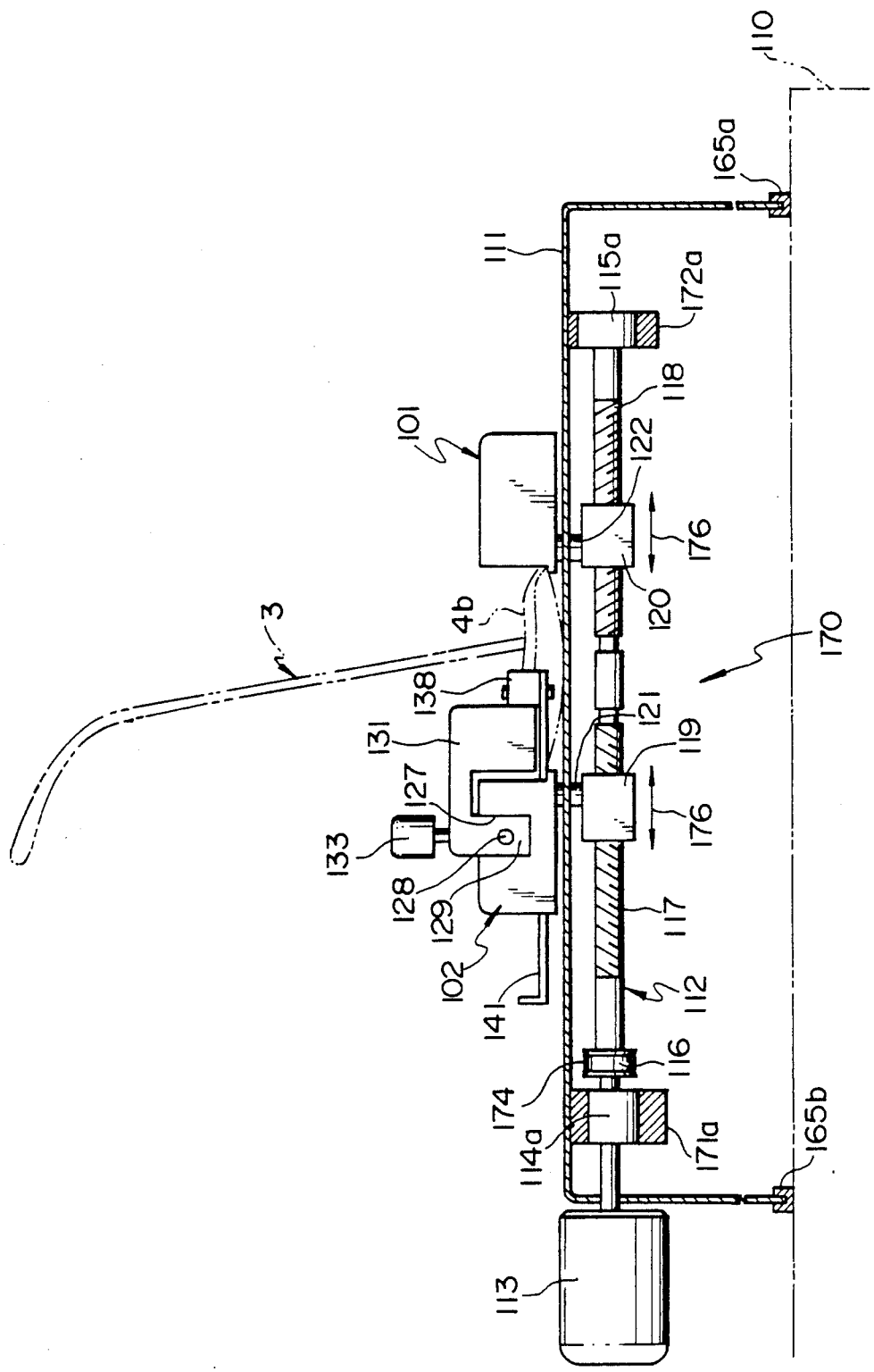
FIG. 4 is a somewhat enlarged cross-sectional view taken along the line IV—IV in FIG. 3, showing a moving mechanism for the first and second holding members.

As clearly shown in FIG. 4, arranged within the frame table 111 is a moving mechanism 170 for translating the first and second holding members 101 and 102 toward and away from each other. The moving mechanism 170 comprises a pair of feed screw shafts 112a and 112b (see also FIG. 3). A rotary knob 113 is fixedly mounted to an end of the feed screw shaft 112a, for manually rotating the same. The feed screw shaft 112a is supported for rotation about its axis, but against movement along the axis by a pair of spaced bearings 114a and 115a which are arranged respectively adjacent one and other ends of the feed screw shaft 112a. The pair of bearings 114a and 115a are fixedly mounted to the inner surface of the top wall of the frame table 111 through respective blocks 171a and 172a. The feed screw shaft 112a is formed with a pair of threaded sections 117 and 118 which are opposite in direction of threads from each other. A pair of carriage nuts 119 and 120 are threadedly engaged respectively with the threaded sections 117 and 118. A pair of pins 121 and 122 having their respective axes extending vertically are fixedly mounted respectively to the upper faces of the carriage nuts 119 and 120. The pins 121 and 122 extend respectively through slots 123 and 124 formed in the top wall of the frame table 111 as shown in FIG. 3. By the pins 121 and 122 fitted respectively in the slots 123 and 124, the respective carriage nuts 119 and 120 can be prevented from being rotated even when the feed screw shaft 112a rotates. The pins 121 and 122 have their respective upper ends which are fixedly connected respectively to one ends of the first and second elongated holding members 101 and 102.

A toothed timing pulley 116a is mounted on the feed screw shaft 112a for rotation therewith at a location adjacent the bearing 114a. The toothed timing pulley 116a is connected to a similar toothed timing pulley 116b through a timing belt 174, as shown in FIG. 3. The toothed timing pulley 116b is mounted on a feed screw shaft 112b for rotation therewith. The feed screw shaft 112b is supported for rotation about its axis, but against movement along the axis by a pair of bearings 114b and 115b. Thus, both the feed screw shafts 112a and 112b rotate in synchronism with each other through the timing belt 174. Although not shown, the feed screw shaft 112b is provided with a pair of threaded sections like those 117 and 118 of the other feed screw shaft 112a. In addition, a pair of carriage nuts are threadedly engaged respectively with the threaded sections of the feed screw shaft 112b, and are connected respectively to the other ends of the first and second elongated holding members 101 and 102 through respective pins which extend respectively through a pair of slots 126 and 127 shown in FIG. 3, in a manner like that associated with the feed screw shaft 112a.

In operation, when the rotary knob 113 is turned, the feed screw shafts 112a and 112b are rotated about their respective axes. By the rotation, the carriage nuts 119 and 120 threadedly engaged respectively with the threaded sections 117 and 118 of the feed screw shaft 112a are moved toward and away from each other in the direction indicated by arrows 176. Likewise, the carriage nuts threadedly engaged respectively with the threaded sections of the feed screw shaft 112b are also moved toward and away from each other in synchronism with the movement of the carriage nuts 119 and 120 owing to the timing belt 174. Thus, the first and second holding members 101 and 102 fixedly connected to the carriage nuts through the pins are moved toward and away from each other in the direction indicated by the arrows 176. In other words, the first and second holding members 101 and 102 are translated toward and away from each other.

As shown in FIGS. 3 and 4, the second holding member 102 is formed, in its upper face, with a groove 127 which is rectangular in cross-sectional shape and which extends longitudinally of the second holding member 102. A rod 128 is accommodated in the groove 127, and is supported against rotation about its axis by a pair of blocks 129 and 130 which are fitted in the groove 127.

Figure 5:
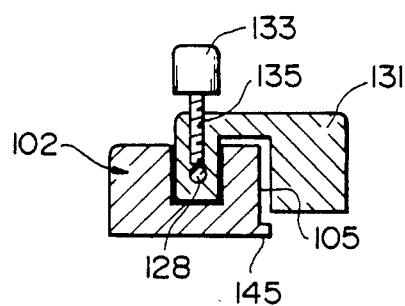
FIG. 5 is a somewhat enlarged cross-sectional view taken along the line V—V in FIG. 3, showing one of a pair of side abutment members.
Figure 6:
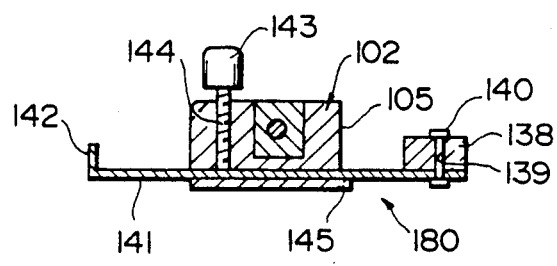
FIG. 6 is a somewhat enlarged cross-sectional view taken along the line VI—VI in FIG. 3, showing a pad retainer assembly.

A pair of right- and left-hand abutment members 131 and 132 for the pair of lens frames 4a and 4b are mounted on the rod 128 for sliding movement therealong. As shown in FIG. 5, a vertical screw 135 provided at its upper end with a rotary knob 133 is threadedly engaged with the right-hand abutment member 131. The screw 135 has its forward end face which can be abutted against the rod 128. Thus, when the screw 135 is loosened by turning of the rotary knob 133 with fingers, the right-hand abutment member 131 can freely moved along the rod 128, while, when the screw 135 is tightened, the right-hand abutment member 131 is retained and fixed in position. Although not shown in detail, the left-hand abutment member 132 is likewise constructed such that the left-hand abutment member 132 can be moved along the rod 128 and can be fixed in position by turning of a rotary knob 134. The right- and left-hand abutment members 131 and 132 have their respective inclined abutment faces 136 and 137. When both the abutment members 131 and 132 are moved toward each other, their respective inclined abutment faces 136 and 137 can be brought respectively into contact with the right- and left-hand lens frames 4b and 4a, making it possible to ensure holding of the lens frames 4a and 4b from the right and left.

A pad retainer assembly 180 is associated with the longitudinal center of the second holding member 102. As clearly shown in FIG. 6, the pad retainer assembly 180 comprises a slide plate 141 which is fitted in a rectangular bore in the holding member 102 for movement toward and away from the first holding member 101. A pad retainer head 138 is mounted on one end of the slide plate 141 through a pin 140. The pad retainer head 138 is formed therein with an elongated slot 139 through which the pin 140 extends. Thus, the pad retainer head 138 can be movable within the range of the elongated slot 139. The other end 142 of the slide plate 141 is bent upright so that one can hold the bent end 142 with fingers. A vertical screw 144 provided at its upper end with a rotary knob 143 is threadedly engaged with the second holding member 102. The screw 144 has its forward end face which can be abutted against the slide plate 141. Thus, when the screw 144 is loosened by turning of the rotary knob 143 with fingers, the slide plate 141 can freely slide toward and away from the first holding member 141, while, when the screw 144 is tightened, the slide plate 141 is retained and fixed in position. In operation, the screw 144 is loosened, and the slide plate 141 is slid toward the first holding member 101 by holding the bent end 142 with the fingers, thereby bringing the pad retainer head 138 into abutment against nose pads of the lens frames 4a and 4b. Subsequently, the screw 144 is tightened to fix the slide plate 141 in position. Thus, the lens frames 4a and 4b can be held in a more stable manner.

Although not shown, the abutment face 104 composed of the inclined face sections 106 and 107, the abutment face 105, the abutment faces 136 and 137, and the pad retainer head 138 are covered with antiskid material such as, for example, rubber.

FIRST MODIFICATION

Figure 7:
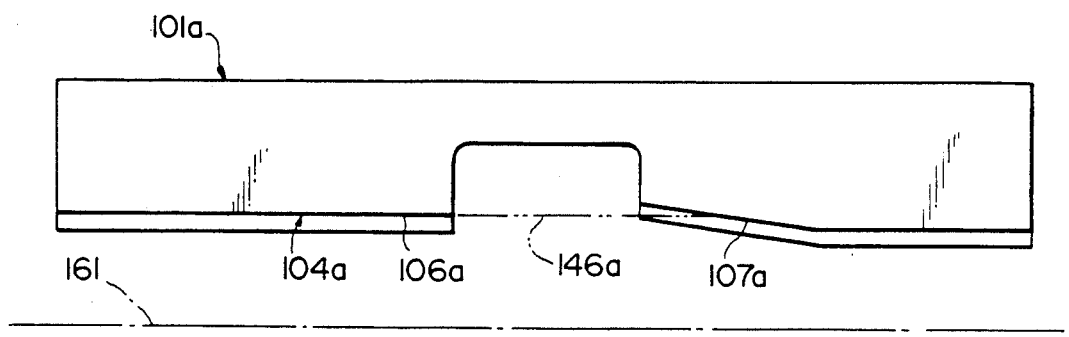
FIG. 7 is a plan view of a modification of the first holding member.

As shown in FIG. 7, the arrangement may be such that one of the pair of face sections 107a of the abutment face 104a of the first holding member 101a is inclined with respect to the first plane 161, while the other face section 106a extends substantially parallel to the first plane 161. In this case, it is required that an extension 146a of the face section 106a is intersected with an intermediate point of the inclined face section 107a. Further, an angle defined between the pair of face sections 106a and 107a is set to at least 90 degrees, but at most 180 degrees, preferably, to a range of from 170 to 175 degrees.

SECOND MODIFICATION

As shown in FIG. 8, the arrangement may be such that one of the pair of face sections 107b of the abutment face 104b of the first holding member 101b is inclined with respect to the first plane 161, while the other face section 106b extends substantially parallel to the first plane 161. In this case, it is required that an extension 146b of the face section 106b is intersected with an intermediate point of the inclined face section 107b. Further, an angle defined between the pair of face sections 106b and 107b is set to at least 180 degrees, but at most 270 degrees, preferably, to a range of from 185 to 190 degrees.

It is of course that the face section 106c may be inclined as indicated by the double dotted lines in FIG. 8. In this case, an angle defined between the pair of face sections 106c and 107b is set to at most 360 degrees, but at least 180 degrees, preferably, to a range of from 190 to 200 degrees.

THIRD MODIFICATION

As shown in FIG. 9, the arrangement may be such that the first and second holding members 101d and 102d have their respective abutment faces 104d and 105d. The abutment face 104d is composed of a pair of face sections 106d and 107d, and the abutment face 105d is composed of a pair of face sections 195a and 195b. The pair of face sections 106d and 107d and the pair of face sections 195a and 195b are inclined with respect to the first plane 161 so as to diverge toward the first plane 161. An angle defined between the pair of face sections 106d and 107d, and an angle defined between the pair of face sections 195a and 195b are substantially the same as that described with reference to FIG. 2.

ANOTHER MODIFICATION

Apart from the above, as will be appreciated by one skilled in the art, the arrangement may be such that the abutment face of the first holding member extend parallel to the first plane, while the abutment face of the second holding member is composed of a pair of face sections which are inclined with respect to the first plane so as to diverge or converge toward the first plane.

MEASURING DEVICE

Referring to FIG. 1, the measuring device 200 comprises a stylus 230 serving as a measuring element arranged adjacent the holding device 100 for horizontal and vertical movement relative to the pair of lens frames 4a and 4b fixedly held by the holding device 100. The stylus 230 is so arranged as to extend through the central opening 199 in the frame table 111 of the holding device 100. The arrangement of the measuring device 200 is such that the stylus 230 provided with a disc-shaped head 232 is moved angularly about an optional reference point, while causing the disc-shaped head 232 to roll along a V-shaped groove formed in the inner periphery of each of the pair of lens frames 4a and 4b, and that the movement or motion of the stylus 230 is detected in a three-dimensional manner.

Figure 10:
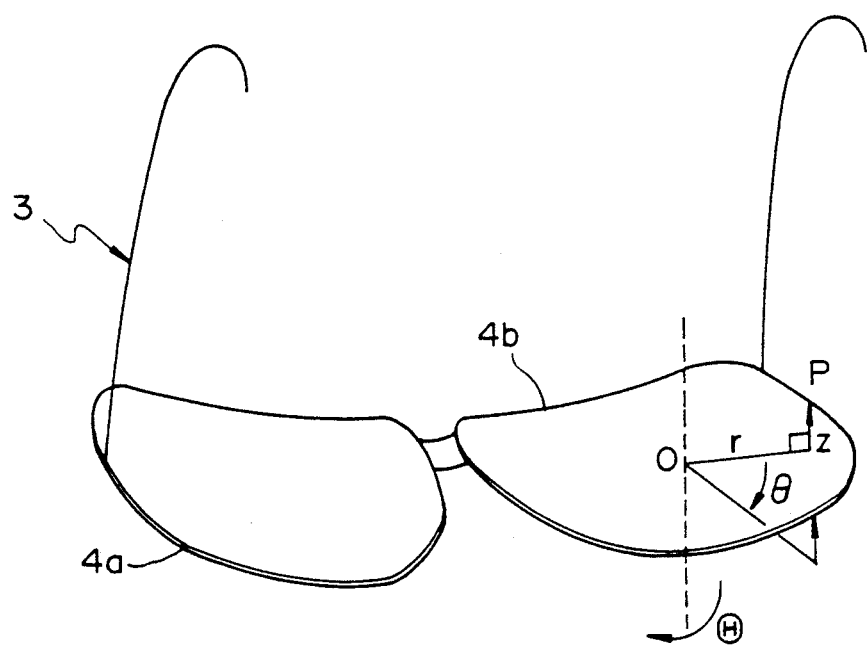
FIG. 10 is a perspective view for explanation of the measuring principle of the measuring device illustrated in FIG. 1.

The coordinate system of the measurement due to the measuring device 200 is illustrated in FIG. 10. In FIG. 10, the reference character O denotes an optional reference point within the lens frame 4b (4a); P, a point on the V-shaped groove in the inner periphery of the lens frame 4b (4a); r, a horizontal straight distance from O to P; z, a vertical straight distance from O to P; and $\theta$, a horizontal angle of the angular movement of the stylus 230 about O. The distances and angle r, z and $\theta$ are measured, and their measuring values are calculated, thereby measuring the configuration of the inner periphery of each of the pair of lens frames 4a and 4b.

Figure 11:
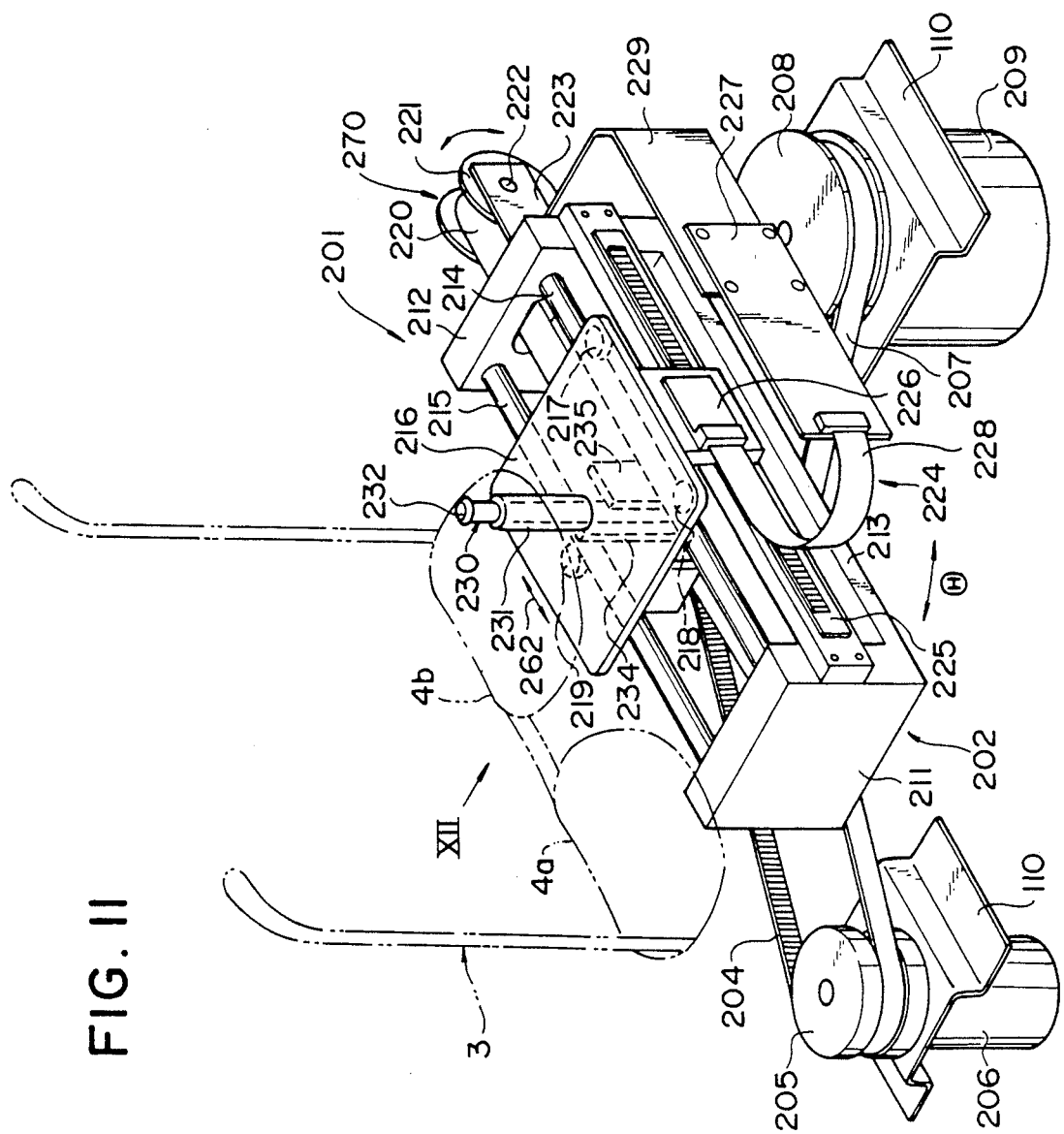
FIG. 11 is a perspective view of the measuring device illustrated in FIG. 1, with the holding device removed.
Figure 12:
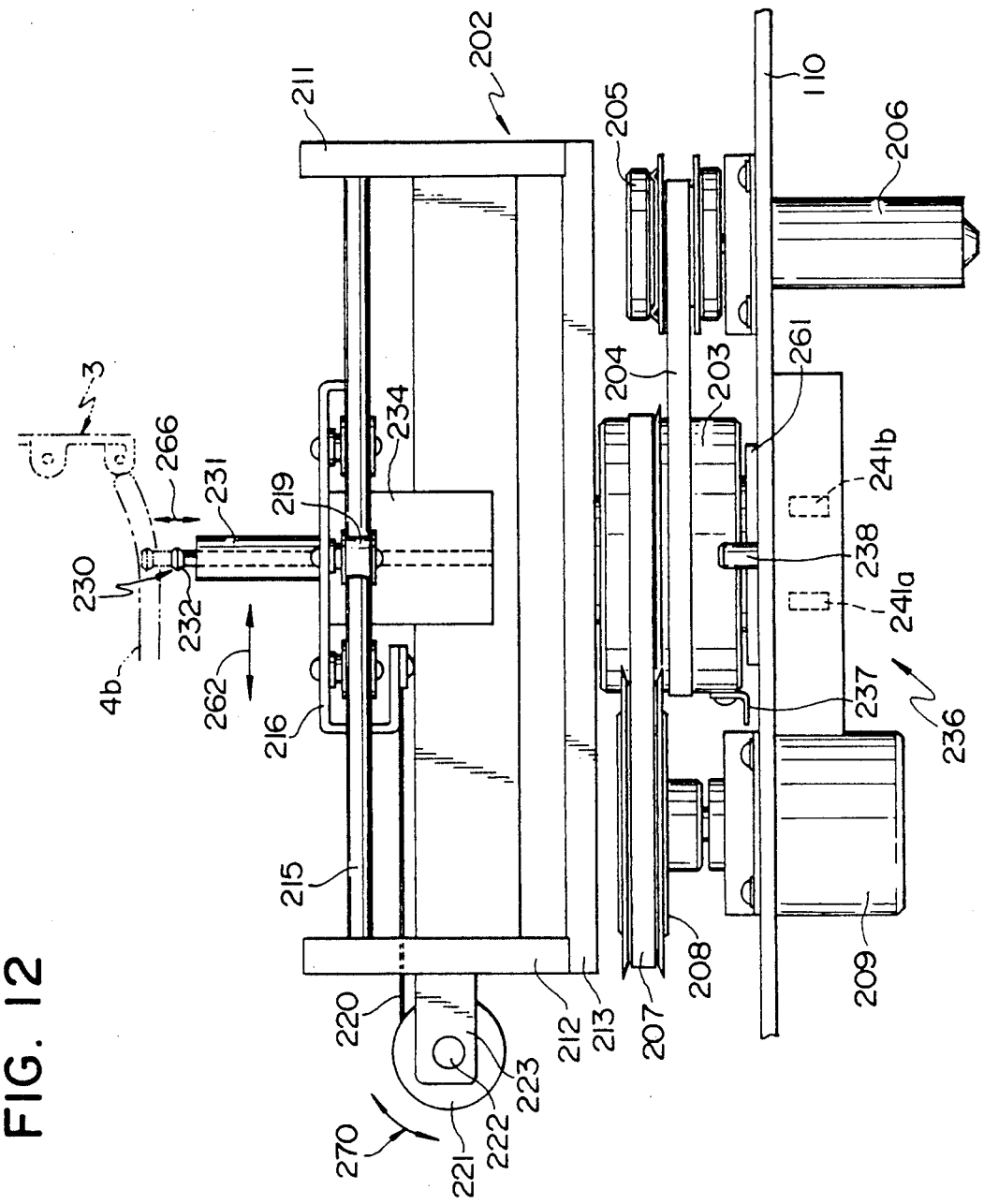
FIG. 12 is a side elevational view of the measuring device illustrated in FIG. 11, as viewed from the arrow XII in FIG. 11.

Referring to FIGS. 11 and 12, the measuring device 200 comprises a generally U-shaped rotary table 202 which is mounted on a timing pulley 203 for rotation therewith about a vertical center axis of the timing pulley 203. The timing pulley 203 is connected to a timing pulley 205 through a timing belt 204. The timing pulley 205 is mounted on an output shaft of a reversible motor 206 for rotation therewith. Thus, the rotary table 202 is driven to rotate about the vertical axis of the timing pulley 203 in both directions indicated by $\theta$ by the reversible motor 206. The timing pulley 203, on which the rotary table 202 is mounted, is connected also to a timing pulley 208 through a timing belt 207. The timing pulley 208 is mounted to a shaft of a rotary encoder 209 for rotation therewith. Thus, an angle of rotation of the timing pulley 203, that is, an angle of rotation of the rotary table 202 is detected by the rotary encoder 209. That is, to be described later, the rotary encoder 209 detects an angle of the angular movement of the stylus 230 about the reference point O during the movement of the stylus 230 along the V-shaped groove in the inner periphery of the lens frame 4b (4a), to generate a signal representative of the angle. The angle signal is sent to a central processing unit (hereinafter referred to as "CPU") 282 to be described later with reference to FIG. 17.

The motor 206 and the rotary encoder 209 are fixedly mounted on the stationary base 110 previously described with reference to FIGS. 3 and 4. In this connection, only parts of the base 110 are shown in FIG. 11 for facilitating view of other component parts of the detecting device 200. The rotary table 202 and the timing pulley 203 are rotatably mounted on the base 110 through a bearing 261 (see FIG. 12).

The rotary table 202 is composed of a pair of spaced side wall sections 211 and 212 and a rectangular center plate section 213 connecting the side wall sections 211 and 212 to each other. A pair of spaced parallel slide guide rods 214 and 215 are fixedly mounted to the pair of side wall sections 211 and 212 and extend horizontally between the pair of side wall sections 211 and 212. A horizontal slide plate 216 is guided along the slide guide rods 214 and 215 for reciprocative movement in the direction indicated by a double-headed arrow 262. For this guidance, the slide plate 216 is provided on its lower surface with three rotatable slide guide rollers 217, 218 and 219. In the illustrated embodiment, the two slide guide rollers 217 and 218 are in rolling contact with the slide guide rod 214, while the remaining slide guide roller 219 is in rolling contact with the slide guide rod 215. These slide guide rollers 217, 218 and 219 roll along the slide guide rods 214 and 215 in such a manner that the slide guide rods are clamped between the two guide rollers 217 and 218 and the remaining guide roller 219. The stylus 230 is mounted on the slide plate 216 to be described later in detail.

A constant spring unit 270 is associated with the slide plate 216 for biasing the stylus 230 in the direction indicated by the arrow 262, into abutment against the V-shaped groove in the inner periphery of the lens frame 4(4a) during movement of the stylus 230 along the inner periphery of the lens frame 4b (4a). Specifically, the spring unit 270 includes a strip-like spring 220 wound into a roll about a busing 221 which is mounted on a shaft 222 for rotation thereabout. The shaft 222 is mounted to a pair of brackets 223 which are fixedly mounted to the outer surface of the side wall section 112 of the rotary table 202. The spring 220 has its end which is fixedly connected to the slide plate 216, for applying a constant biasing force to the slide plate 216 toward the side wall section 212 of the rotary table 202. The remaining portion of the spring 220 is wound into roll about the bushing 221 as described above.

As will be understood from the forgoing, the rotary table 202, the slide plate 216, the spring unit 270 and so on cooperate with each other to form a moving mechanism 201 which is associated with the stylus 230 for moving the same angularly about the optional reference point O (see FIG. 10) within one of the pair of lens frames 4a and 4b, along the inner periphery of the lens frame, while causing the stylus 230 to be in contact with the inner periphery of the lens frame.

A reflective-type linear encoder 224 serving as a displacement measuring scale is provided, which detects an amount of movement r of the slide plate 216 in the direction indicated by the arrow 262. In other words, the linear encoder 224 detects horizontal straight displacement r of the stylus 230 from the reference point O, during the movement of the stylus 230 along the V-shaped groove in the inner periphery of the lens frame 4b (4a), to generate a signal representative of the horizontal straight displacement r. Specifically, the linear encoder 224 comprises a elongated scale 225 which is fixedly mounted to the rotary table 202 and which extends horizontally between both the side wall sections 212 and 213 thereof. A detector 226 is fixedly mounted to the slide plate 216 and is slidable along the scale 225. An amplifier 227 is fixedly mounted to the side wall section 212 of the rotary table 202 through an L-shaped bracket 229. The detector 226 and the amplifier 227 is connected through a flexible cable 228.

The characteristic of the linear encoder utilizes a diffraction phenomenon, and has such an advantage as to extend a limit value of the use of the scale pitch. For example, the linear encoder is effective also as a fine or minute scale equal to or less than 1 $\mu$m pitch. Accordingly, the liner encoder has an operation which corresponds to the mechanical operation of a prove, particularly, there is obtained the linear encoder which aims at a small size, a high precision and a high resolution, in measurement in length.

Movement of the slide plate 216 along the slide guide rods 214 and 215 causes the detector 226 to be moved along the elongated scale 255, while a predetermined distance is left between the detector 226 and a face of the scale 225. In response to this movement, the detector 226 outputs pulse signals to the amplifier 227 through the flexible cable 228. The pulse signals from the detector 226 are amplified by the amplifier 227 and are sent to a counter 281 to be described later with reference to FIG. 17.

A sleeve 231 is fixedly mounted on the slide plate 216 and has an axis extending vertically. The stylus 230 is fitted in the sleeve 231 for rotation about the axis thereof and for movement along the axis of the sleeve 231 in a direction indicated by an arrow 266 through a slide bearing incorporated in the sleeve 231. The stylus 230 has the aforesaid disc-shaped head 232 which is engageable with the V-shaped groove in the inner periphery of the lens frame 4b (4a) under the biasing force of the spring 220. The disc-shaped head 232 is also capable of rolling along the V-shaped groove in the inner periphery of the lens frame 4b (4a) when the rotary table 202 is rotated about the vertical axis of the timing pulley 203.

During the movement of the stylus 230 along the inner periphery of the lens frame 4b (4a), the stylus 230 moves radially correspondingly to the configuration of the lens frame. An amount of this radial movement, that is, the horizontal straight displacement r in the direction indicated by the arrow 262 is detected by the linear encoder 224 through the sleeve 231 and the slide plate 216 as mentioned previously.

Further, the stylus 230 also moves in the direction indicated by the arrow 266 correspondingly to the curve of the inner periphery of the lens frame 4b (4a). An amount of the vertical movement in the direction indicated by the arrow 266 is detected by a displacement measuring scale or a Z-axis detecting unit 233. That is, the Z-axis detecting unit 233 detects the vertical straight displacement z of the stylus 230 from the reference point O, during the movement of the stylus 230 along the V-shaped groove in the inner periphery of the lens frame 4b (4a), to generate a signal representative of the vertical straight displacement z.

Figure 13:
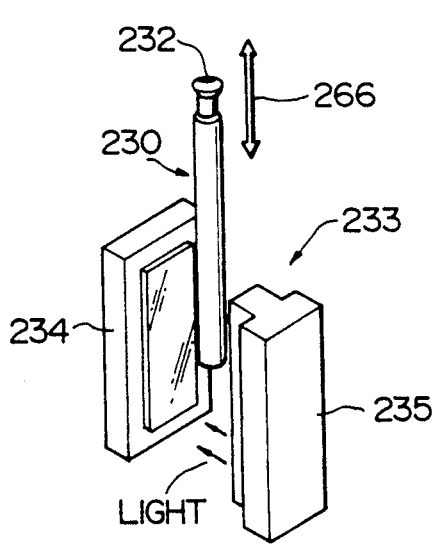
FIG. 13 is a perspective view of a Z-axis detecting unit incorporated in the measuring device illustrated in FIG. 11.
Figure 14:
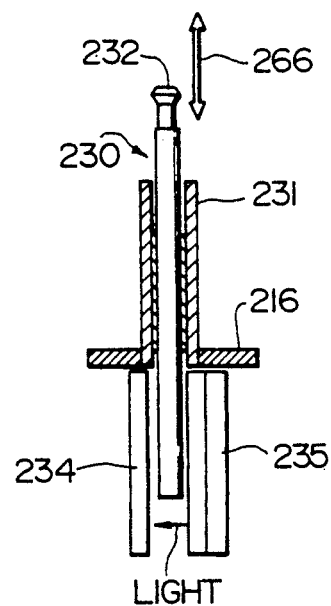
FIG. 14 is a partially cross-sectional side elevational view of the Z-axis detecting unit illustrated in FIG. 13.
Figure 15:
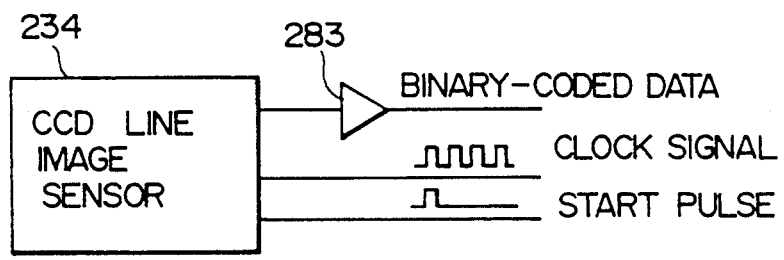
FIG. 15 is a block diagram showing signal processing from a CCD line image sensor illustrated in FIGS. 13 and 14.

As shown in FIGS. 13 and 14, the Z-axis detecting unit 233 comprises a CCD line image sensor 234 and a light source 235 which are arranged in opposed, but spaced relation to each other with a lower end portion of the elongated stylus 230 positioned between the CCD line image sensor 234 and the light source 235. In the illustrated embodiment, the light source 235 includes a plurality of light emitting diodes arranged vertically. When the CCD line image sensor 234 is illuminated with a light from the light source 235, a shadow of the lower end portion of the stylus 230 is formed on the CCD line image sensor 234. Accordingly, when the lower end portion of the stylus 230 moves vertically correspondingly to the curve the lens frame 4b (4a), the boundary between the light portion and the dark portion on the CCD line image sensor 234 also moves vertically. With such arrangement, by detecting the distance from the end of the measuring surface of the CCD line image sensor 234 to the boundary, it is possible to measure the vertical straight displacement z of the stylus 230. The CCD line image sensor 234 converts the brightness on each point on the measuring surface into voltage. As shown in FIG. 15, in response to a start pulse given from the CPU 282 (FIG. 17), the CCD line image sensor 234 outputs the voltage corresponding to the brightness in order from the end of the measuring surface of the CCD line image sensor 234, in synchronism with clock signals from the CPU 282. The voltage from the CCD line image sensor 234 is binary-coded by a comparator 283 at an optional level. A counter 284 (see FIG. 8) connected to the CCD line image sensor 234 and to the CPU 282 counts the number of the clock signals from the start pulse to a point of change from 0 (zero) to 1 of the binary-coded signal, that is, the number of the clock signals from the start pulse to the boundary between the bright portion and the dark portion of the measuring surface of the CCD line image sensor 234, thereby measuring the vertical straight displacement z of the stylus 230.

Figure 16:
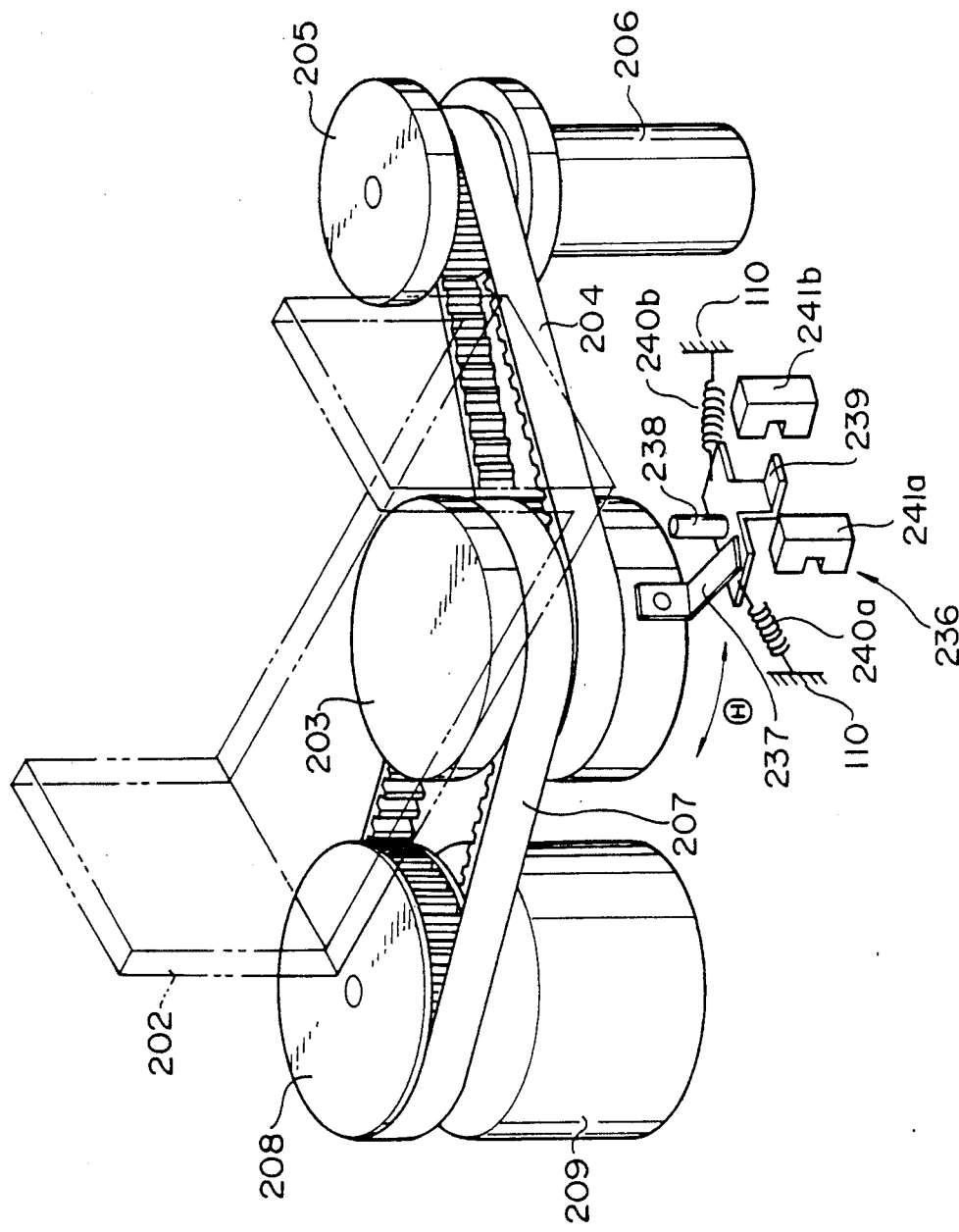
FIG. 16 is a perspective view of the measuring device illustrated in FIG. 11, showing a rotation-limit unit for a motor.

As shown in FIGS. 12 and 16, in particular, in FIG. 16, the measuring device 200 further comprises a rotation-limit unit 236 for stopping rotation of the reversible motor 206 after measurement of one of the pair of lens frames 4a and 4b. Since, normally, it is premised on an assumption that the left- and right-hand lens frames are measured, one of them is measured and, subsequently, the motor 206 is revered in rotational direction so that the other lens frame is measured. That is, the rotation-limit unit 236 is associated with the timing pulley 203 for stopping rotation of the reversible motor 206 after one revolution of the timing pulley 203. Specifically, the rotation-limit unit 236 includes an L-shaped projecting member 237 which is fixedly mounted to the peripheral surface of the timing pulley 203 for angular movement therewith. A pin 238 having a vertical axis is fixedly mounted to a shielding member 239 which is supported floatingly by a pair of springs 240a and 240b connected to the base 110. The projecting member 237 is capable of being abutted against the pin 238 on the shielding member 239 to move the same. A pair of spaced photo-interrupters 241a and 241b are fixedly mounted on the base 110 and are arranged along a moving locus of the shielding member 239, correspondingly to the normal and reverse rotations of the timing pulley 203, that is, the rotary table 202. The reason why two photo-interrupters are arranged is that when a machine is abruptly switched off during operation or is halted in operation for any reason, the subsequent repair and continue of the machine cause the latter to be again measured, and the rotary table is not made equal to or higher two revolutions. That is, the rotary table has a lower potion which has a signal cable for the sensor arranged, torsion or twisting of the signal cable is prevented to cause normal and reversion of the motor to be controlled precisely, or the like. Accordingly, when the motor is stopped at any location and, subsequently, the power is tuned-on and is returned to rotate the motor, any one of the photo-interrupters is dispersed to thereby detect the origin position. By the position of the photo-interrupter, the motor is controlled in its normal and reverse and is controlled so as not to make equal to and higher than two revolutions in the same direction. When, for example, the timing pulley 203 rotates in the counterclockwise direction as viewed in FIG. 16, the projecting member 237 is abutted against the pin 235 to move the shielding member 239 to the right. The shielding member 239 intercepts the light in the photo-interrupter 241b to generate an interrupting signal. The interrupting signal is inputted to the CPU 282 to stop rotation of the motor 206.

In addition, when the timing pulley 203 is rotated in the clockwise direction, the projecting member 237 is again rotated in the clockwise direction in the united fashion with the timing pulley 203. Accordingly, the urging force to the pin 238 is released, and the pin 238 and the shielding member 239 are returned to a position between the photo-interrupters 241a and 241b.

Further, when the timing pulley 203 is rotated, the projecting member 237 urges the pin 238 from the clockwise rotational direction. The shielding member 239 passes through the photo-interrupter 241a to shield the light, thereby stopping the reversible motor 206.

Figure 17:
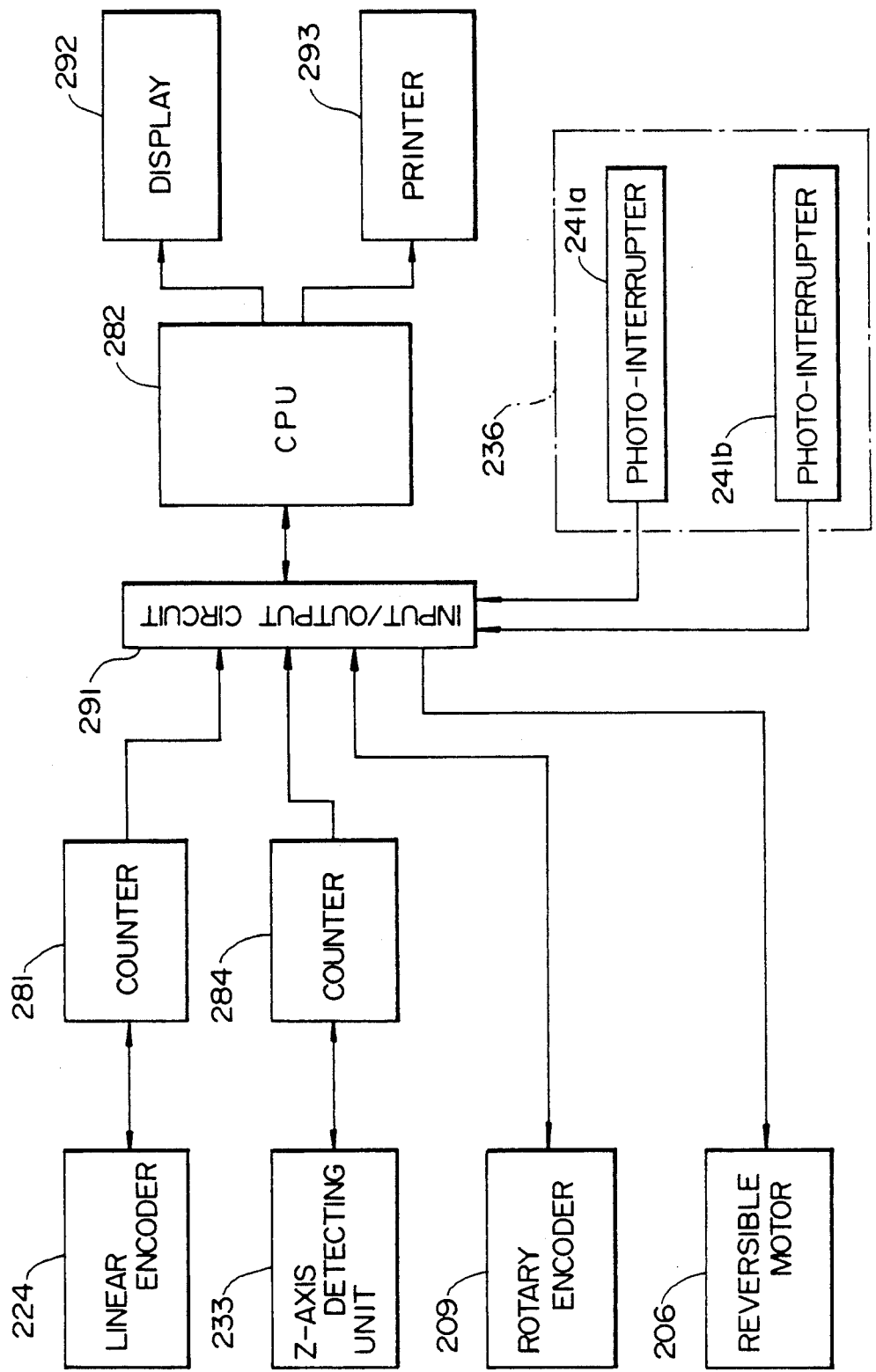
FIG. 17 is a block diagram showing a control system incorporated in the measuring device illustrated in FIGS. 11 through 16.

As shown in FIG. 17, the linear encoder 224 is connected to an input/output circuit 291 through the counter 281. Likewise, the Z-axis detecting unit 233 is connected to the input/output circuit 291 through the counter 284. The rotary encoder 209, the reversible motor 206 and the pair of photo-interrupters 241a and 241b are connected directly to the input/output circuit 291. The input/output circuit 291 is connected to the CPU 282 to which connected are a display unit 292 for displaying the output from the CPU 282 and a printer 293 for printing out the output from the CPU 282.

OPERATION

The operation of the measuring apparatus constructed as above, according to the first embodiment, will be described.

The pair of lens frames 4a and 4b of the spectacle framework 3 are fixedly held between the pair of holding members 101 and 102 of the holding device 100 as shown in FIG. 1. Then, the disc-shaped head 232 of the stylus 230 is abutted against the V-shaped groove in the inner periphery of one of the pair of lens frames 4a and 4b. When a start switch (not shown) is turned on, the CPU 282 sends a command signal to the reversible motor 206 to start rotation thereof. Rotation of the motor 206 is transmitted to the timing pulley 203 through the timing belt 204 to rotate the rotary table 202 about the vertical axis, so that the stylus 230 is moved angularly while being in rolling contact with the V-shaped groove in the inner periphery of the lens frame 4b (4a). Rotation of the rotary table 202 is transmitted to the rotary encoder 209 through the timing belt 207 to rotate the rotary encoder 209, whereby an angle of rotation $\theta$ is detected. An amount of radial movement of the stylus 230, that is, a horizontal straight displacement of the stylus 230 is detected as an amount of movement r of the slide plate 216 in the direction indicated by the arrow 262 by the linear encoder 224. An amount of vertical movement of the stylus 230, that is, a vertical straight displacement z of the stylus 230 is detected by the Z-axis detector unit 233. At this time, an origin signal of the rotary encoder 209 is inputted to the CPU 282. On the basis of the signal from the rotary encoder 209 representative of the angle of rotation $\theta$, a signal indicative of the horizontal straight displacement r, from the counter 281 connected to the linear encoder 224 and a signal indicative of the vertical straight displacement z, from the counter 284 connected to the Z-axis detecting unit 233 are stored in order in a memory within the CPU 282. On the basis of these data $\theta$, r and z, the CPU 282 executes calculation to obtain a three-dimensional configuration of the inner periphery of the lens frame 4b (4a). When the origin signal of the rotary encoder 209 is again inputted after one revolution of the rotary table 202, storage of the data is interrupted. The projecting member 237 of the rotation-limit unit 236 is abutted against the pin 238 to move the shielding member 239, whereby the shielding member 239 intercepts the light in the photo-interrupter 241a or 241b to generate an interrupting signal. In response to this interrupting signal, the CPU 282 sends a signal to the motor 206 to stop rotation thereof.

After the measurement of the configuration of the lens frame 4b, the stylus 230 is moved downwardly, and the moving mechanism 166 shown in FIG. 3 moves the frame table 111 to move the pair of lens frames 4a and 4b horizontally by a predetermined setting distance in such a manner that the stylus 230 is located within the other lens frame 4a for measurement of a configuration of an inner periphery of the other lens frame 4a. From the predetermined setting distance, and from the measuring data on both the lens frames 4a and 4b, it is possible to know the relative positional relationship between the pair of lens frames 4a and 4b. (Frame Pupil Distance) The various data from the CPU 282 can be displayed on the display unit 292, or can be printed out by the printer 293. It is of course that the data from the CPU 282 may be sent to another computer system.

It is to be understood that any other suitable displacement scales including those of electromagnetic induction type, magnetic type, optical type and so on may be substituted for the linear encoder 224 and the Z-axis detecting unit 233.

SECOND EMBODIMENT

Figure 18:
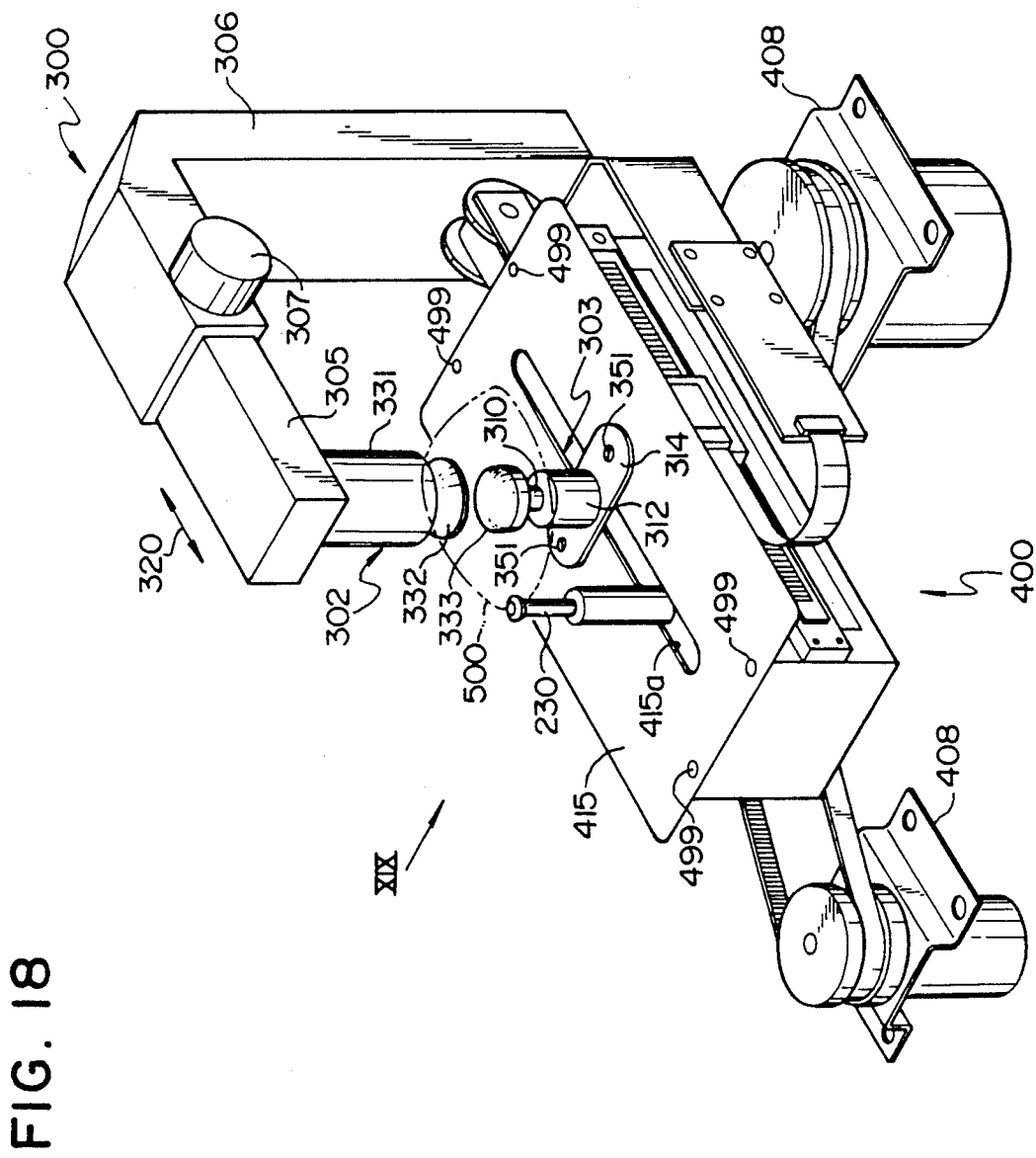
FIG. 18 is a perspective view of a measuring apparatus according to another embodiment of the invention, which comprises a holding device and a measuring device.

Referring to FIG. 18, there is illustrated an apparatus for measuring a configuration of a substantially planar article, according to a second embodiment of the invention. The measuring apparatus generally comprises a holding device 300 for holding the article and a measuring device 400 for measuring the configuration of the article. The article may be any one of a demonstration lens, a spectacle lens, a template, an optical lens and so on. The template is a flat plate which is manufactured by a spectacle framework maker in conformity with the configuration of each of various lens frames. In the illustrated embodiment, the article will be described below on behalf of the demonstration lens 500. The demonstration lens 500 is fitted in one of a pair of lens frames of wire structure, during manufacture of the lens frames. In the wire structure, the lens frames are made of elongated wire material formed of metal, synthetic resinous material or the like so that there is no lens fitting groove in the inner periphery of the lens frame.

HOLDING DEVICE

Figure 19:
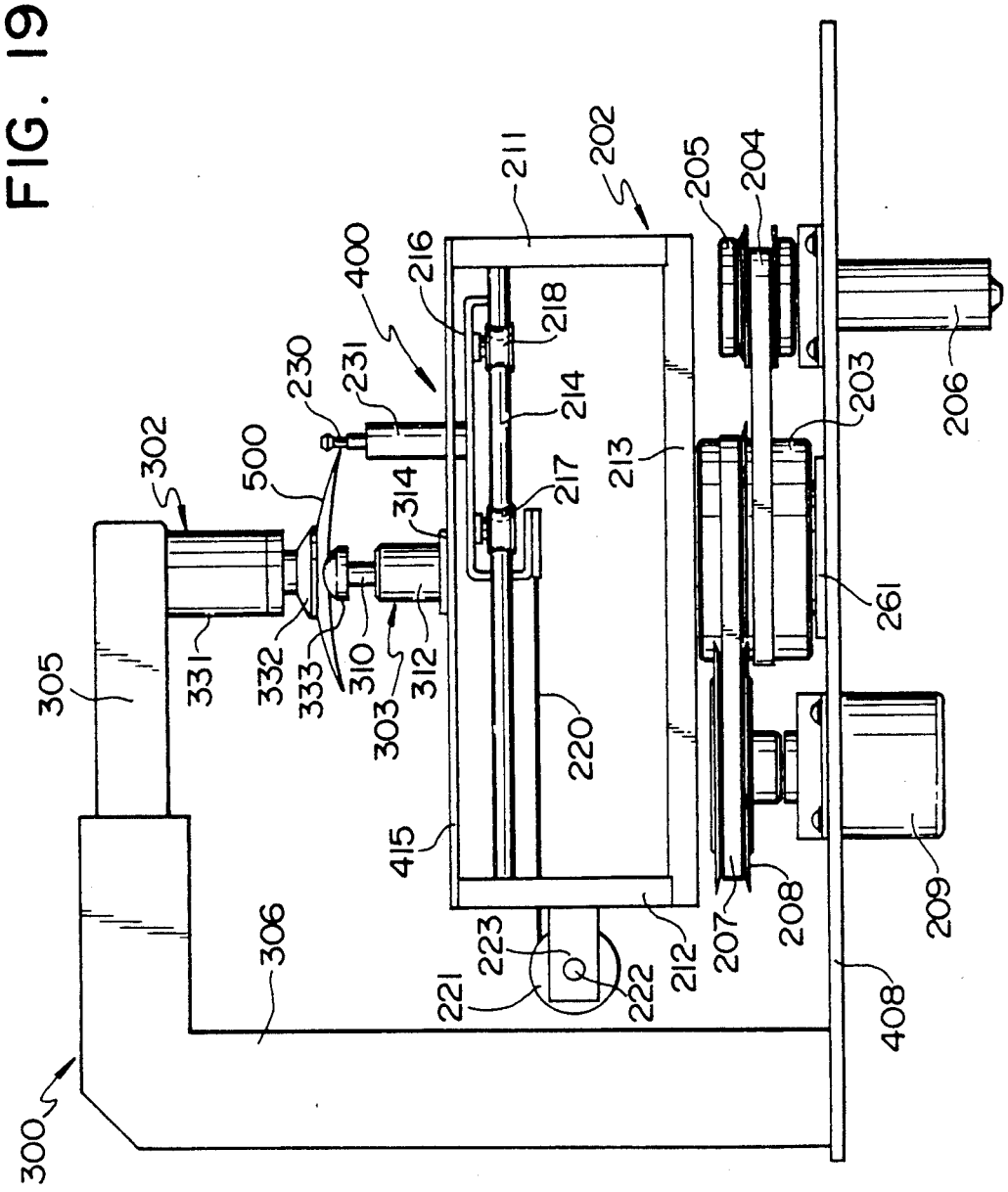
FIG. 19 is a side elevational view of the measuring apparatus illustrated in FIG. 18, as viewed from the arrow XIX in FIG. 18.

As shown in FIGS. 18 and 19, the holding device 300 is so arranged as to clamp a substantially central region of the demonstration lens 500 from above and below to fixedly hold the demonstration lens 500 substantially horizontally. Specifically, the holding device 300 comprises an inverted L-shaped stand 306 having an upper horizontal hollow leg and a vertical leg which are connected to each other at 90 degrees. The vertical leg has its lower end which is fixedly mounted on a stationary base 408. In this connection, only parts of the base 408 are shown in FIG. 18 for facilitating view of other component parts of the detecting device 400. An arm member 305 is fitted in the horizontal leg of the L-shaped stand 306 for sliding movement relative thereto in a direction indicated by an arrow 320 in a detachable manner. The arm member 305 can be fixed in position within the upper leg of the L-shaped stand 306 by means of a set screw 307. The holding device 300 includes a pair of upper and lower holders 302 and 303 having their respective axes which extend vertically and which are aligned with each other. The upper and lower holders 302 and 303 cooperate with each other to clamp therebetween the demonstration lens 500, thereby fixedly holding the same.

The upper holder 302 has a cylindrical holder element 331 and a suction cup 332 mounted to a lower end of the holder element 331. The suction cup 332 is made of synthetic resinous material such as rubber or the like, and is provided for enabling the demonstration lens 500 to be held under vacuum. However, a mere abutment element having no function as the suction cup 332 may be attached to the lower end of the holder element 331. In this case, it is desirable that the abutment element is formed with a concave abutment face substantially matched to an upper convex surface of the demonstration lens 500.

The holder element 331 of the upper holder 302 is mounted to the lower surface of the arm member 305 in a replaceable manner. Although not shown, the holder element 331 can be mounted to the arm member 305 in any desirable manners including a threadedly-engaging manner, a fitting manner and the like. By the replaceability of the holder element 331, large number of types of upper holder elements are prepared and a suitable one can be selected from them in accordance with an article to be measured in configuration.

Figure 20:
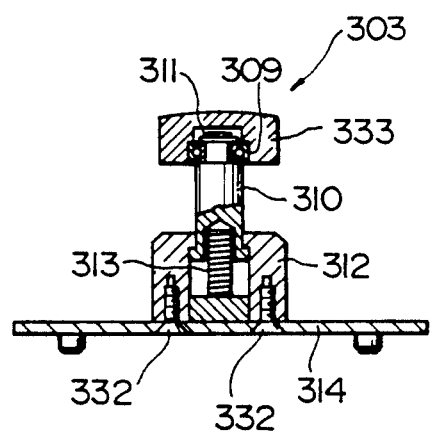
FIG. 20 is a somewhat enlarged cross-sectional view of a lower holder illustrated in FIGS. 18 and 19.

As shown in detail in FIG. 20, the lower holder 303 has a head 333 having a convex top surface substantially matched to a lower concave surface of the demonstration lens 500. The head 333 is rotatably mounted to an upper end of a support rod 310 through a bearing 309, and is prevented from being detached from the upper end of the support rod 310 by means of a retainer 311. The support rod 310 has its lower end which is accommodated in a cap member 312 serving as a guide for the support rod 310 such that the support rod 310 is movable vertically. The support rod 310 is prevented from being disengaged from the cap member 312 by means of a radial flange formed at the lower end of the support rod 310. The cap member 312 is fixedly mounted to a mount plate 314 by screws 332 as shown also in FIG. 21. A coil spring 313 is arranged under compression within the cap member 312 to bias the support rod 310 vertically upwardly, thereby bringing the head 333 into abutment against the lower concave surface of the demonstration lens 500. When the coil spring 313 is fully compressed, it serves as a stopper for the support rod 310.

MEASURING DEVICE

Figure 22:
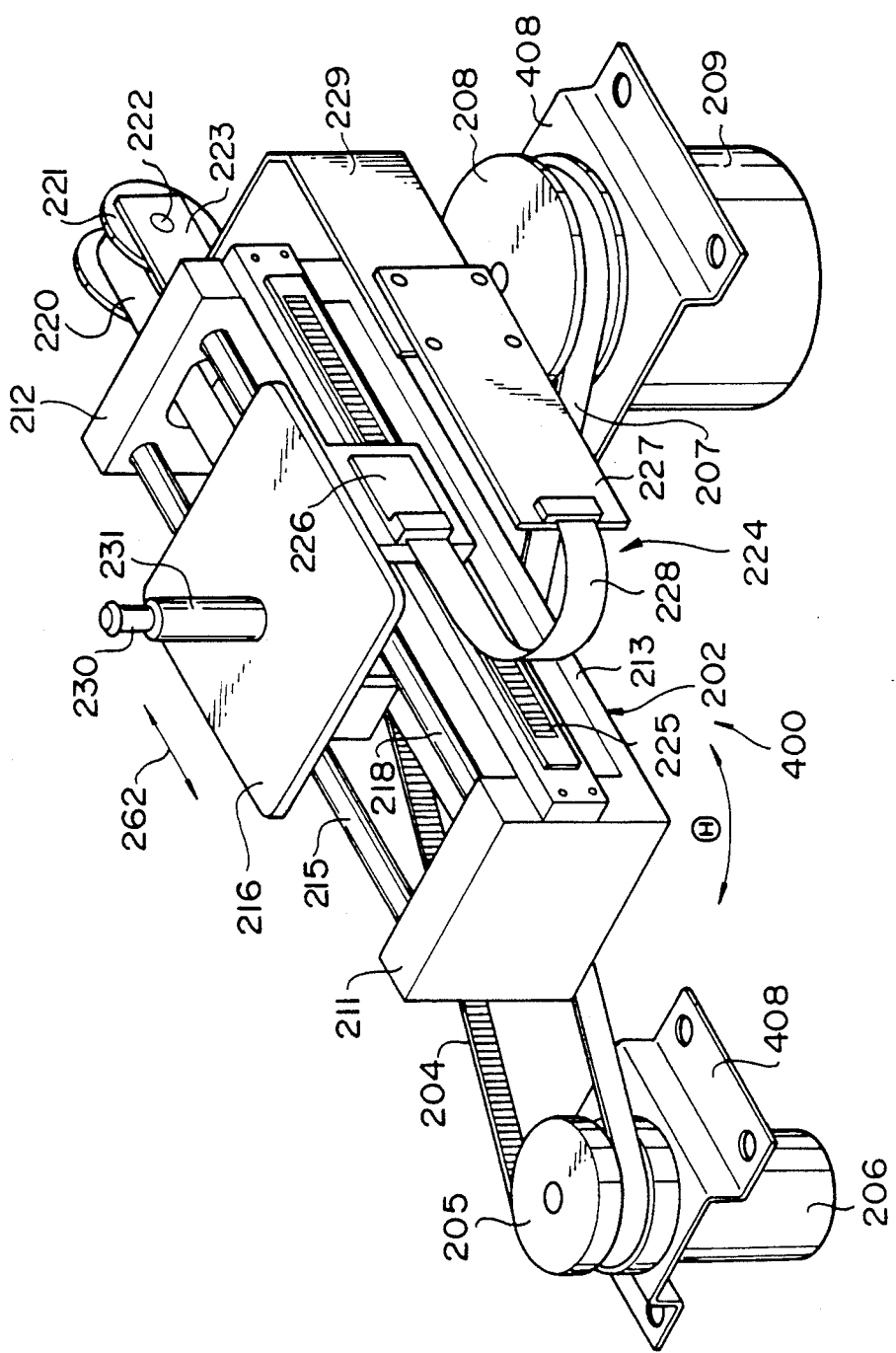
FIG. 22 is a perspective view of the measuring device illustrated in FIGS. 18 and 19, with a cover plate and the holding device removed.

As shown in FIGS. 18, 19 and 22, the measuring device 400 is substantially the same in construction or arrangement as the measuring device 200 illustrated in FIGS. 11 and 12 and, therefore, only different points will be described below in order to avoid duplication. That is, the component parts like or similar to those illustrated in FIGS. 11 and 12 are designated by the same or like reference numerals, and the description of the like or similar component parts will be omitted for simplification.

Figure 21:
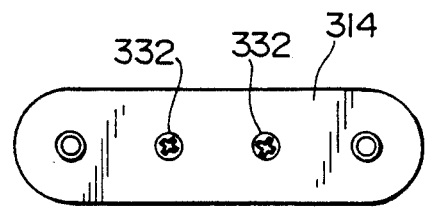
FIG. 21 is a bottom view of a mount plate on which the lower holder illustrated in FIG. 20 is mounted.

As shown in FIGS. 18 and 19, a cover plate 415 is fixedly mounted to the top surfaces of the respective side wall sections 211 and 212 of the U-shaped rotary table 202 by means of screws 499. The cover plate 415 is formed therein with an elongated slot 415a extending parallel to the pair of slide guide rods 214 and 215 (refer to FIG. 22). The slide plate 216, on which the stylus 230 is mounted, is arranged below the cover plate 415 in such a manner that the stylus 230 extends through the slot 415a in the cover plate 415 for movement along the slot 415 a. The mount plate 314 of the lower holder 303 shown in detail in FIGS. 20 and 21 is fixedly mounted to the cover plate 415 in a manner straddling the slot 415a by means of screws 351 such that the lower holder 303 is vertically aligned with the axes of the respective timing pulley 203 and bearing 226.

Figure 23:
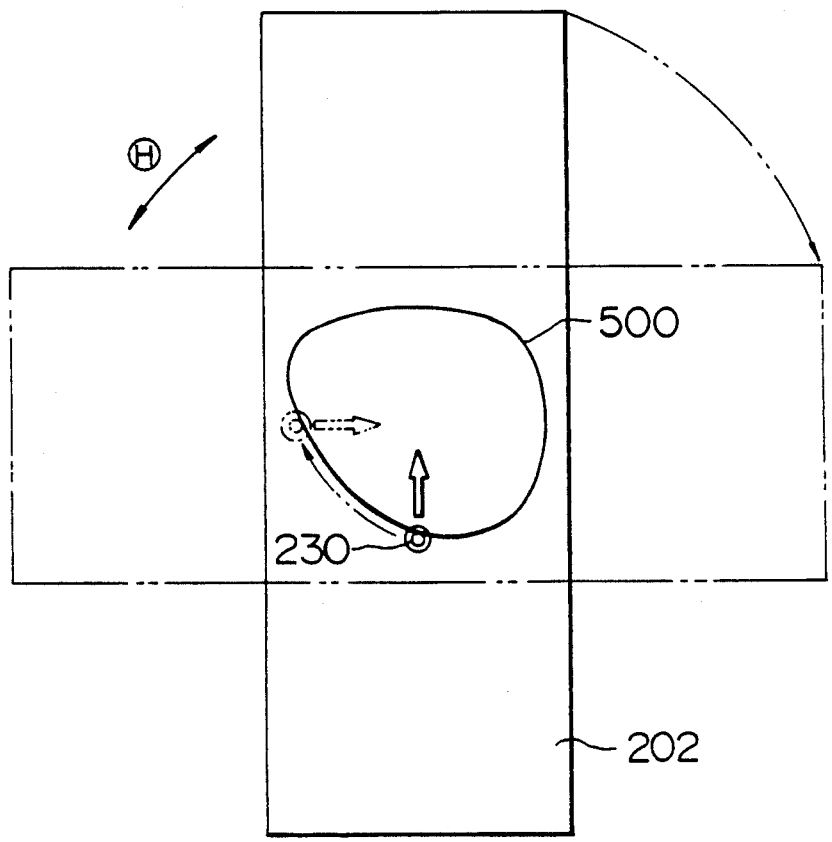
FIG. 23 is a diagrammatic view showing the relationship between a rotary table and a measuring element illustrated in FIGS. 18 and 19, during measurement.

The remaining construction of the measuring device 400 is substantially the same as that of the measuring device 200. Specifically, the stylus 230 is arranged adjacent the holding device 300 for horizontal movement relative to the demonstration lens 500 which is fixedly held by the upper and lower holders 302 and 303 of the holding device 300. The reversible motor 206, the timing belt 204 and the pulley 203 are associated with the stylus 230 for moving the same angularly about an optional reference point along an outer periphery of the demonstration lens 500, while causing the stylus 500 to be in rolling contact with the outer periphery of the demonstration lens 500 under the action of the spring unit 270, as shown in FIG. 22. Like the previously described first embodiment, the spring unit 270 biases the stylus 230 into abutment against the outer periphery of the demonstration lens 500 during the movement of the stylus 230 along the outer periphery of the demonstration lens 500 as indicated by arrows in FIG. 23. The linear encoder 224 detects horizontal straight displacement of the stylus 230 from the reference point, during the movement of the stylus 230 along the outer periphery of the demonstration lens 500, to generate a signal representative of the horizontal straight displacement. The rotary encoder 209 detects a horizontal angle of the angular movement of the stylus 230 about the reference point during the movement of the stylus 230 along the outer periphery of the demonstration lens 500, to generate a signal representative of the angle. Although not shown, it is needless to say that the measuring device 400 comprises the rotation-limit unit 236 illustrated in FIG. 16.

Figure 24:
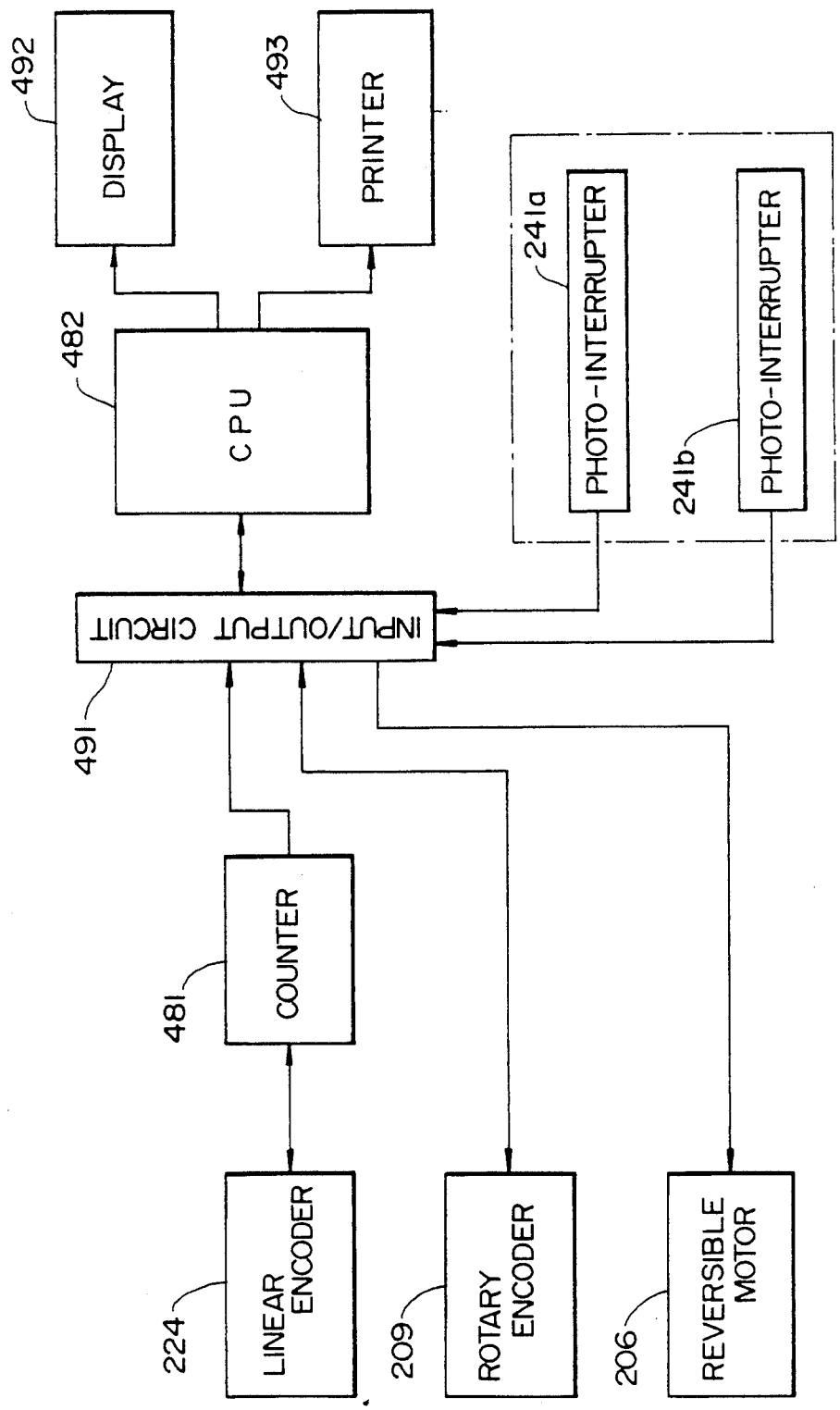
FIG. 24 is a block diagram showing a control system incorporated in the measuring apparatus illustrated in FIGS. 18 through 22.
Figure 25:
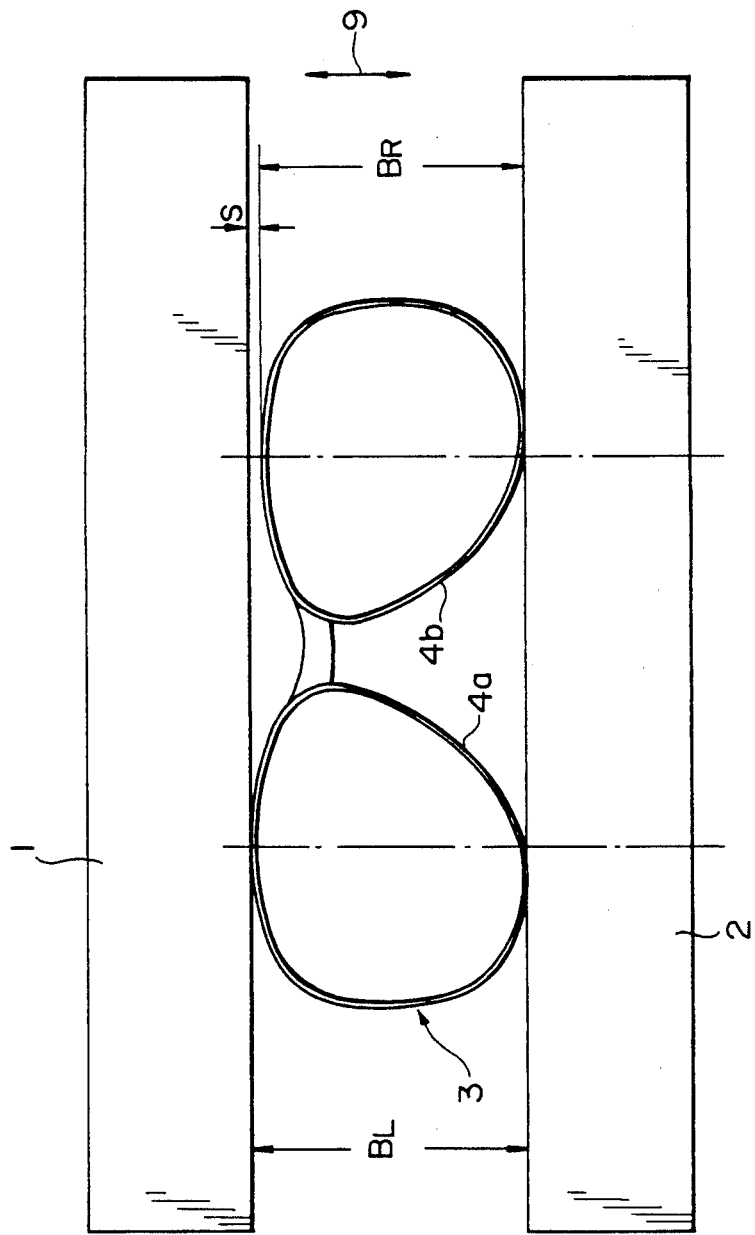
FIG. 25 is a view similar to FIG. 2, but showing a pair of first and second holding members of the conventional holding device.

A CPU 482 is connected to the linear encoder 224 and the rotary encoder 209 for calculating the configuration of the outer periphery of the demonstration lens 500 on the basis of the signals from the respective linear and rotary encoders 224 and 209. Specifically, as shown in FIG. 24, the linear encoder sensor 224 is connected to an input/output circuit 491 through a counter 481. The rotary encoder 209, the reversible motor 206 and the pair of photo-interrupters 241a and 241b are connected directly to the input/output circuit 491. The input/output circuit 491 is connected to the CPU 482 to which connected are a display unit 492 for displaying output from the CPU 482 and a printer 493 for printing out the output from the CPU 482.

OPERATION

The operation of the measuring apparatus constructed as above, according to the second embodiment, will be described.

The demonstration lens 500 is attracted under vacuum to the suction cup 332 of the upper holder 302 and is fixedly held between the suction cup 332 and the head 333 of the lower holder 303 biased under the biasing force of the spring 313, as shown in FIGS. 18 and 19. Then, the stylus 230 is abutted against the outer periphery of the demonstration lens 500. When a start switch (not shown) is turned on, the CPU 482 sends a command signal to the reversible motor 206 to start rotation thereof. Rotation of the motor 206 is transmitted to the timing pulley 203 through the timing belt 204 to rotate the rotary table 202 about the vertical axis, so that the stylus 230 is moved angularly while being in rolling contact with the outer periphery of the demonstration lens 500. Rotation of the rotary table 202 is transmitted to the rotary encoder 209 through the timing belt 207 to rotate the rotary encoder 209, whereby an angle of rotation is detected. An amount of radial movement of the stylus 230, that is, a horizontal straight displacement of the stylus 230 is detected as an amount of movement of the slide plate 216 in the direction indicated by the arrow 262 by the linear encoder 224. At this time, an origin signal of the rotary encoder 209 is inputted to the CPU 482. On the basis of the signal from the rotary encoder 209 representative of the angle of rotation and a signal indicative of the horizontal straight displacement, from the counter 481 connected to the linear encoder 224 are stored in order in a memory within the CPU 482. On the basis of these data, the CPU 482 executes calculation to obtain a configuration of the outer periphery of the demonstration lens 500. When the origin signal of the rotary encoder 209 is again inputted after one revolution of the rotary table 202, storage of the data is interrupted. The rotation-limit unit generates an interrupter signal. In response to this interrupter signal, the CPU 482 sends a signal to the motor 206 to stop rotation thereof.

It is to be noted that, in the measuring device 400, although the stylus 230 is fitted in the sleeve 231 for rotation about its axis and for movement along its axis, it is not necessarily required that the Z-axis detecting unit 233 illustrated in FIGS. 13 and 14 is associated with the lower end portion of the stylus 230.

What is claimed is:

1. An apparatus for measuring a configuration of each of a pair of lens frames of a spectacle framework comprising:

holding means for fixedly holding said pair of lens frames;

a measuring element arranged adjacent said holding means for horizontal and vertical movement relative to said pair of lens frames fixedly held by said holding means;

moving means associated with said measuring element for moving the same angularly about an optional reference point within one of said pair of lens frames, along an inner periphery of the lens frame, while causing said measuring element to be in contact with the inner periphery of the lens frame;

said moving means further comprising a rotary table rotatable about a vertical axis, a slide member mounted on said rotary table for rotation together with the same, but for horizontal sliding movement relative to said rotary table, said measuring element being mounted on said slide member for vertical movement relative thereto, and biasing means connected to said slide member for biasing the same to cause said measuring element to be in contact with the inner periphery of the lens frame;

first detecting means for detecting horizontal straight displacement of said measuring element from said reference point during the movement of said measuring element along the inner periphery of the lens frame to generate a signal representative of the horizontal straight displacement;

said first detecting means including a linear encoder comprising a scale fixedly mounted to said rotary table, a detector fixedly mounted to said slide member and slidable along said scale, an amplifier fixedly mounted to said rotary table, and a flexible cable through which said detector and said amplifier is connected, wherein said scale is elongated in shape and extends horizontally;

second detecting means for detecting vertical straight displacement of said measuring element from said reference point, during the movement of said measuring element along the inner periphery of the lens frame, to generate a signal representative of the vertical straight displacement;

third detecting means for detecting an angle $\theta$ of the angular movement of said measuring element about said reference point during the movement of said measuring element along the inner periphery of the lens frame, to generate a signal representative of the angle;

means connected to said first, second and third detecting means for calculating the configuration of the inner periphery of the lens frame on the basis of said signals from the respective first, second and third detecting means; and a sleeve fixedly mounted on said slide member and having an axis extending vertically, wherein said measuring element includes an elongated stylus fitted in said sleeve for movement along the axis of said sleeve and for rotation about the axis of said sleeve, said stylus having a disc-shaped head engageable with the inner periphery of the lens frame, said second detecting means further comprising a CCD line image sensor and a light source arranged in opposed, but spaced relation to each other with a lower end portion of said elongated stylus positioned between said CCD line image sensor and said light source.

2. An apparatus according to claim 1, characterized by including biasing means (270) for biasing said measuring element (230) into abutment against the inner periphery of the lens frame during the movement of said measuring element along the inner periphery of the lens frame.

3. An apparatus according to claim 1, characterized in that the angle detected by said third detecting means (209) is a horizontal angle of the angular movement of said measuring element (230) about said reference point (O).

4. An apparatus according to claim 3, characterized in that said moving means further comprises a timing pulley on which said rotary table is mounted for rotation together with said timing pulley about said vertical axis, wherein said third detecting means includes a rotary encoder and timing belt means through which said rotary encoder is connected to said timing pulley to rotate said rotary encoder.

5. An apparatus for measuring a configuration of each of a pair of lens frames of a spectacle framework comprising:

holding means for fixedly holding said pair of lens frames;

a measuring element arranged adjacent said holding means for horizontal and vertical movement relative to said pair of lens frames fixedly held by said holding means;

moving means associated with said measuring element for moving the same angularly about an optional reference point within one of said pair of lens frames, along an inner periphery of the lens frame, while causing said measuring element to be in contact with the inner periphery of the lens frame;

first detecting means for detecting horizontal straight displacement of said measuring element from said reference point, during the movement of said measuring element along the inner periphery of the lens frame, to generate a signal representative of the horizontal straight displacement;

second detecting means for detecting vertical straight displacement of said measuring element from said reference point, during the movement of said measuring element along the inner periphery of the lens frame, to generate a signal representative of the vertical straight displacement;

third detecting means for detecting an angle $\theta$ of the angular movement of said measuring element about said reference point during the movement of said measuring element along the inner periphery of the lens frame, to generate a signal representative of the angle; and calculating means connected to said first, second and third detecting means for calculating the configuration of the inner periphery of the lens frame on the basis of said signals from the respective first, second and third detecting means;

said holding means comprising:
- a pair of first and second holding members arranged in spaced relation to each other with a first plane positioned between them, wherein said first plane includes geometric centers of the respective lens frames and extends perpendicularly to a second plane including said lens frames, said first and second holding members having their respective abutment faces opposed to each other; and
- second moving means for translating at least one of said first and second holding members toward and away from the other, wherein, when said second moving means translates said at least one holding member toward the other holding member, said abutment faces of the respective first and second holding members cooperate with each other to clamp therebetween said pair of lens frames, thereby holding the same, wherein, of said first and second holding members, at least the first holding member has its abutment face composed of a pair of face sections, at least one of said pair of face sections being inclined with respect to said first plane.

6. An apparatus for measuring a configuration of a substantially planar article, comprising:

holding means for clamping a substantially central region of said article from above and below to fixedly hold said article substantially horizontally;

said holding means including a pair of upper and lower holders having their respective axes extending vertically and aligned with each other, said upper and lower holders cooperating with each other to clamp therebetween said article, thereby fixedly holding the same; said holding means further includes an arm member, said upper holder being mounted on said arm member in a replaceable manner; said upper holder has a holder element and a suction cup mounted to a lower end of said holder element;

a measuring element arranged adjacent said holding means for horizontal movement relative to said article fixedly held by said holding means;

moving means associated with said measuring element for moving the same angularly about an optional reference point along an outer periphery of said article, while causing said measuring element to be in contact with the outer periphery of said article;

said moving means comprising a rotary table rotatable about a vertical axis, a slide member mounted on said rotary table for rotation together with the same, but for horizontal sliding movement relative to said rotary table, said measuring element being mounted on said slide member, and biasing means connected to said slide member for biasing the same to cause said measuring element to be in contact with the outer periphery of said article;

a sleeve fixedly mounted on said sliding member and having an axis extending vertically, wherein said measuring element includes an elongated stylus fitted in said sleeve for rotation about the axis of said sleeve;

first detecting means for detecting horizontal displacement of said measuring element from said reference point, during the movement of said measuring element along the outer periphery of said article, to generate a signal representative of the horizontal displacement;

second detecting means for detecting angular movement of said measuring element about said reference point during the movement of said measuring element along the outer periphery of said article, to generate a signal representative of the angular movement; and means connected to said first and second detecting means for calculating the configuration of the outer periphery of said article on the basis of said signals from the respective first and second detecting means.

7. A holding device for holding a pair of lens frames of a spectacle framework, characterized by comprising:

a pair of first and second holding members arranged in spaced relation to each other with a first plane positioned between them, wherein said first plane includes geometric centers of the respective lens frames and extends perpendicularly to a second plane including said lens frames, said first and second holding members having their respective abutment faces opposed to each other; and moving means for translating at least one of said first and second holding members toward and away from the other, wherein, when said moving means translates said at least one holding member toward the other holding member, said abutment faces of the respective first and second holding members cooperate with each other to clamp therebetween said pair of lens frames thereby holding the same, wherein, of said first and second holding members, at least first holding member has its abutment face composed of a pair of face sections, at least one of said pair of face sections being inclined with respect to said first plane.

8. An apparatus for measuring a configuration of each of a pair of lens frames of a spectacle framework, said apparatus comprising:

holding means for fixedly holding said pair of lens frames horizontally;

a measuring element arranged adjacent said holding means for horizontal and vertical movement relative to said pair of lens frames fixedly held by said holding means;

moving means associated with said measuring element for moving the same angularly about an optional reference point within one of said pair of lens frames along an inner periphery of the lens frame while causing said measuring element to be in contact with the inner periphery of the lens frame;

first detecting means for detecting horizontal straight displacement of said measuring element from said reference point during the movement of said measuring element along the inner periphery of the lens frame to generate a signal representative of the horizontal straight displacement;

second detecting means for detecting vertical straight displacement of said measuring element from said reference point during the movement of said measuring element along the inner periphery of the lens frame to generate a signal representative of the vertical straight displacement;

third detecting means for detecting an angle of the angular movement of said measuring element about said reference point during the movement of said measuring element along the inner periphery of the lens frame to generate a signal representative of the angle;

means connected to said first, second and third detecting means for calculating the configuration of the inner periphery of the lens frame on the basis of said signals from the respective first, second and third detecting means;

said moving means comprises a rotary table rotatable about a vertical axis, a slide member mounted on said rotary table for rotation together with the same, but for horizontal sliding movement relative to said rotary table, said measuring element being mounted on said slide member for vertical movement relative thereto, and biasing means connected to said slide member for biasing the same to cause said measuring element to be in contact with the inner periphery of the lens frame, and said moving means further comprises a timing pulley on which said rotary table is mounted for rotation together with said timing pulley about said vertical axis, a reversible motor, timing belt means through which said reversible motor is connected to said timing pulley for rotating said rotary table about said vertical axis, and rotation-limit means associated with said timing pulley for stopping rotation of said reversible motor after one revolution of said timing pulley.

9. An apparatus according to claim 8, wherein said rotation-limit means includes a projecting member fixedly mounted to said timing pulley, a shielding member, said projecting member being capable of being abutted against said shielding member to move the same, and a pair of spaced photo-interrupters arranged along a moving locus of said shielding member.

10. An apparatus according to claim 8, further comprising a biasing means for biasing said measuring element into abutment against the inner periphery of the lens frame during the movement of said measuring element along the inner periphery of the lens frame.

11. An apparatus according to claim 8, wherein said moving means comprises a rotary table rotatable about a vertical axis, a slide member mounted on said rotary table for rotation together with the same, but for horizontal sliding movement relative to said rotary table, said measuring element being mounted on said slide member for vertical movement relative thereto, and biasing means connected to said slide member for biasing the same to cause said measuring element to be in contact with the inner periphery of the lens frame.

12. An apparatus according to claim 11, further comprising a sleeve fixedly mounted on said slide member and having an axis extending vertically, wherein said measuring element includes an elongated stylus fitted in said sleeve for movement along the axis of said sleeve and for rotation about the axis of said sleeve, said stylus having a disc-shaped head engageable with the inner periphery of the lens frame.

13. An apparatus according to claim 11, wherein said first detecting means includes a linear encoder.

14. An apparatus according to claim 13, wherein said linear encoder comprises a scale fixedly mounted to said rotary table and a detector fixedly mounted to said slide member and slidable along said scale.

15. An apparatus according to claim 14, wherein said linear encoder further comprises an amplifier fixedly mounted to said rotary table, and a flexible cable through which said detector and said amplifier is connected, wherein said scale is elongated in shape and extends horizontally.

16. An apparatus according to claim 12, wherein said second detecting means comprises a CCD line image sensor and a light source arranged in opposed, but spaced relation to each other with a lower end portion of said elongated stylus positioned between said CCD line image sensor and said light source.

17. An apparatus according to claim 11, characterized in that the angle detected by said third detecting means is a horizontal angle of the angular movement of said measuring element about said reference point.

18. An apparatus according to claim 17, wherein said moving means further comprises a timing pulley on which said rotary table is mounted for rotation together with said timing pulley about said vertical axis, wherein said third detecting means includes a rotary encoder and timing belt means through which said rotary encoder is connected to said timing pulley to rotate said rotary encoder.

* * * * *